(12) United States Patent
Ashizaki

(10) Patent No.: US 6,856,434 B2
(45) Date of Patent: Feb. 15, 2005

(54) IMAGE REPRODUCING APPARATUS AND IMAGE ILLUMINATING APPARATUS

(75) Inventor: Koji Ashizaki, Tokyo (JP)

(73) Assignee: Sony Corporation (JP)

( * ) Notice: Subject to any disclaimer, the term of this patent is extended or adjusted under 35 U.S.C. 154(b) by 321 days.

(21) Appl. No.: 10/184,877

(22) Filed: Jul. 1, 2002

(65) Prior Publication Data
US 2003/0007129 A1 Jan. 9, 2003

(30) Foreign Application Priority Data
Jul. 5, 2001 (JP) ................................ P2001-242987

(51) Int. Cl.[7] .............................................. G03H 1/22
(52) U.S. Cl. ........................ 359/32; 359/23; 359/35; 348/51; 353/7
(58) Field of Search .............................. 359/22, 23, 25, 359/26, 32, 33, 35; 348/51; 353/7

(56) References Cited

U.S. PATENT DOCUMENTS 3,736,039 A * 5/1973 Hay ............................ 359/23
5,570,207 A * 10/1996 Chang ......................... 359/2

FOREIGN PATENT DOCUMENTS

| CA | 2289999 | 5/2001 |
|----|---------|--------|
| JP | 2001-142382 | 5/2001 |
| WO | WO 87/07737 | 12/1987 |
| WO | WO 91/00553 | 1/1991 |
| WO | WO 96/02873 A1 | 2/1996 |
| WO | WO 99/00993 | 1/1999 |

OTHER PUBLICATIONS

Australian Written Opinion and Search Report dated Mar. 21, 2003.
"Instant Holographic Portrait Printing System", 3D Image Conference 1998, Jul. 1998.
"Instant Holographic Portrait Printing System", SPIE, vol. 3293, pp. 246–253, Jan. 1998.

* cited by examiner

Primary Examiner—Leo Boutsikaris
(74) Attorney, Agent, or Firm—Rader, Fishman & Grauer PLLC; Ronald P. Kananen

(57) ABSTRACT

Angle of incidence of reproducing light with respect to a hologram or a holographic stereogram is adjusted so that a reproduced image can be repetitively viewed without requiring the viewer to move his or her viewpoint. The components of the image reproducing apparatus can be roughly classified into a power supply unit equipped with a power supply for generating a driving power and various types of electric circuits, a light source unit equipped with light emitting diodes and the like, a supporting unit for supporting the light source unit, and a holographic stereogram display unit for holding the holographic stereogram and displaying an image. In this image reproducing apparatus, the light source unit is swingably or turnably moved repetitively with respect to the holographic stereogram so that the reproducing light has angle of incidence changed on the holographic stereogram, thus allowing change of viewed image.

51 Claims, 18 Drawing Sheets

F I G. 4 A
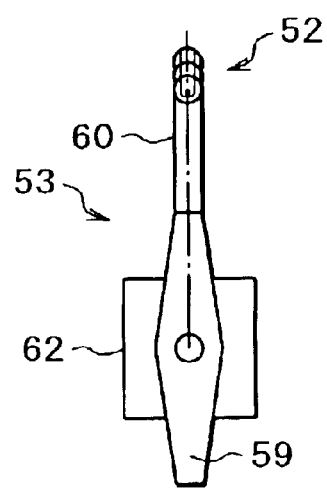
F I G. 4 B
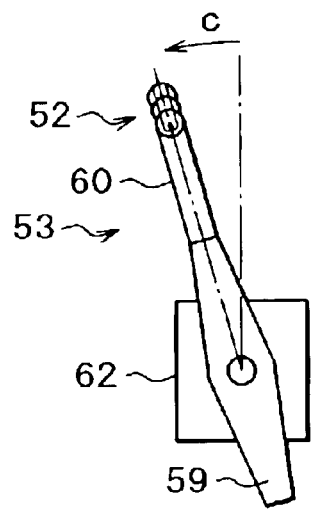
F I G. 4 C
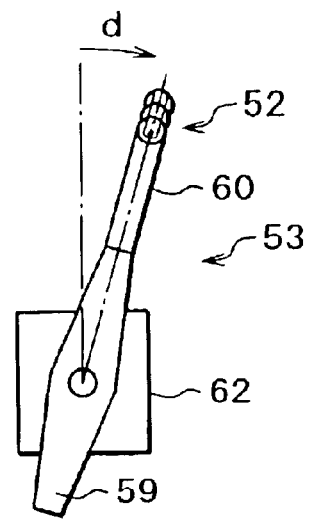

$I = I_{DSS}$

F I G. 1 8
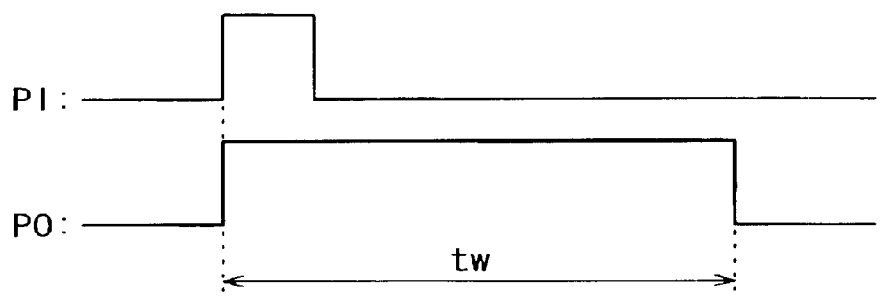
F I G. 1 9
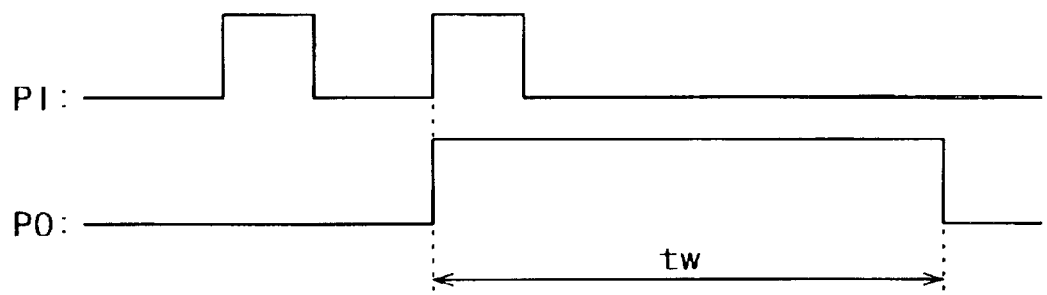

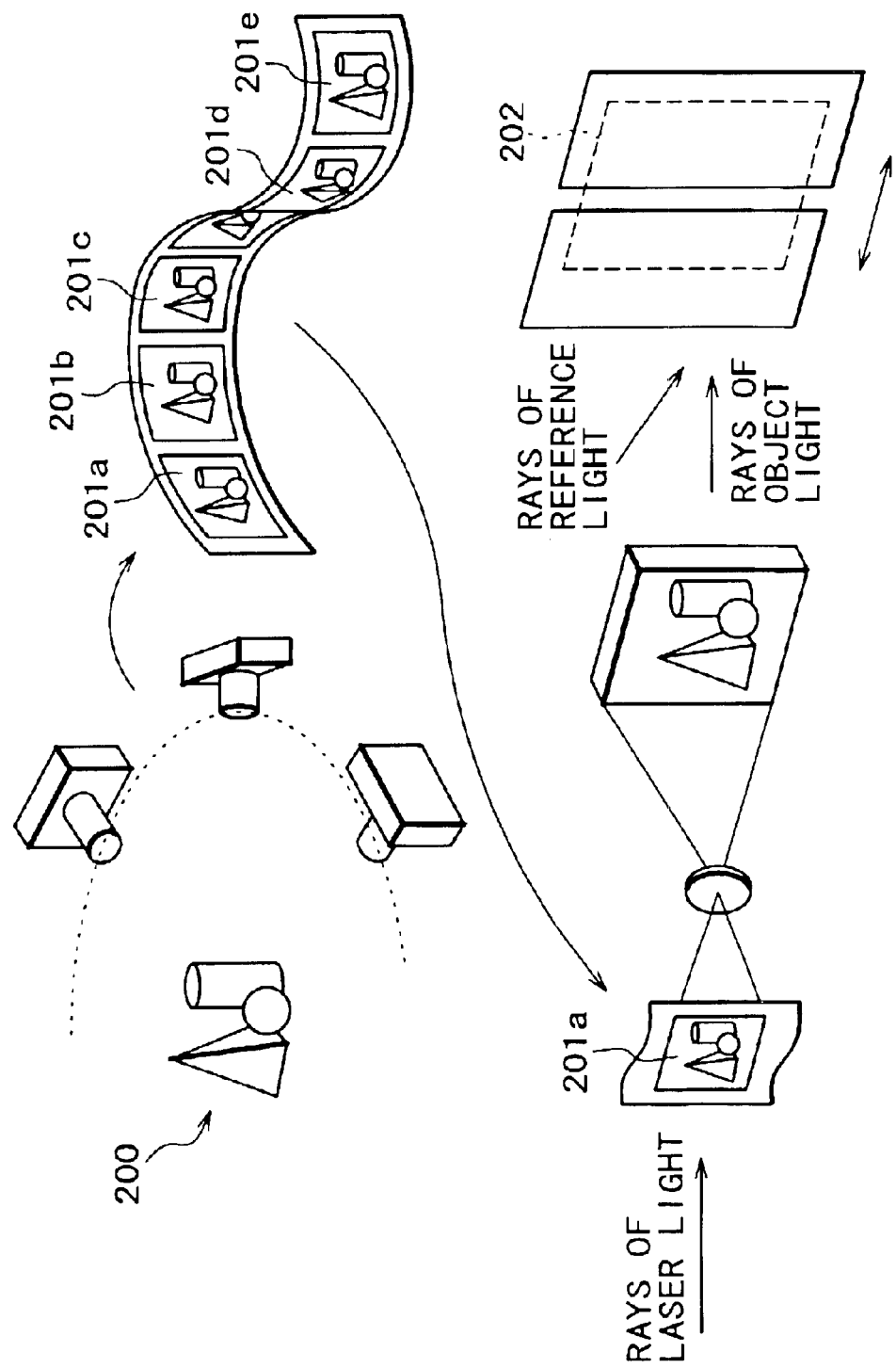

IMAGE REPRODUCING APPARATUS AND IMAGE ILLUMINATING APPARATUS

CROSS REFERENCE TO RELATED APPLICATIONS

This application claims priority to Japanese Patent Application No. JP 2001-242987, filed on Jul. 5, 2001, the disclosure of such application being herein incorporated by reference to the extent permitted by law.

BACKGROUND OF THE INVENTION

1. Field of the Invention

The present invention relates to an image reproducing apparatus for reproducing image data recorded on a hologram or a holographic stereogram by light exposure process. The present invention also relates to an image illuminating apparatus for irradiating light on the hologram or the holographic stereogram so as to reproduce image data recorded on the hologram or the holographic stereogram by light exposure process.

2. Related Art

A holographic stereogram can be fabricated in such a manner that, for example, an object image is captured sequentially from different view angles to obtain a number of captured images as source images and these captured images are sequentially recorded on a single sheet of hologram recording medium by a light exposure process as strips of element holograms or dot-like element holograms.

As shown for example in FIG. 26, a holographic stereogram containing parallax information only in a lateral direction can be fabricated in the following manner. That is, an object image 200 is captured (imaged) sequentially from different view angles in a lateral direction to obtain a plurality of captured images as source images 201a to 201e. Then, these captured source images 201a to 201e are sequentially displayed on a display unit of a holographic stereogram fabricating apparatus having a predetermined optical system. The displayed image is placed under laser light irradiation to cause interference between the object light undergoing modulation due to the image and reference rays of light. The interference fringes created by the interference are sequentially recorded on a hologram recording medium 202 as strips of element holograms. Thus, the holographic stereogram can be fabricated.

The holographic stereogram fabricated in the above manner contains image data, which is obtained by sequential image capture of the object image in the different view angles in the lateral direction and sequentially recorded in the lateral direction as strips of element holograms. Therefore, if a viewer looks at the holographic stereogram from a certain position with a single eye, a set of image data recorded as part of respective element holograms can be recognized as a two-dimensional image (hereinafter referred to as 2D image). Further, if the viewer looks at the holographic stereogram from a position different from that position with a single eye, then a set of image data recorded as another part of respective element holograms can be recognized as another 2D image. Accordingly, if the viewer looks at the holographic stereogram with both the eyes, owing to the parallax of the left and right eyes, the image recorded by the light exposure process can be recognized as a three-dimensional image (hereinafter referred to as 3D image).

Some applications utilizing the above mentioned holographic stereogram can be found in material such as "Akira Shirakura, Nobuhiko Kihara and Shigeyuki Baba, "Instant holographic portrait printing system", Proceeding of SPIE, Vol. 3293, pp. 246–253, January 1998", "Kihara, Shirakura, Baba, "Instant holographic portrait printing system", 3D image conference 1998, July 1998" and so on. The above-introduced material discloses a printer system combined with an image pick-up apparatus for creating parallax image series created by picking up an object image and a printer apparatus for yielding a holographic stereogram or a hologram as a printed material such as a holographic stereogram fabricating apparatus for fabricating a holographic stereogram. The above printer system can provide a series of services from the step of image capture of the imaged object to a step of printing the resulting image.

As a matter of fact, when an image is reproduced from the hologram or the holographic stereogram, reproducing light determined by the reference light utilized upon recording the image are requested. As a source of the reproducing light, laser light may be utilized similarly to the situation of recording. However, if an image is recorded on a so-called rainbow hologram, Lippman hologram or the like, the light source need not be coherent. For example, an incoherent light source such as a halogen lamp may be utilized. Further, when an image is reproduced from a display hologram which displays the image for a viewer, for example, illuminating by parallel rays of light such as those of sunlight, illuminating of a substantial spot light source or a substantial parallel light source such as a spot light of a halogen lamp or the like may be utilized as reproducing light.

When an image is reproduced from the hologram or the holographic stereogram, it is desirable for the reproducing light irradiated from the light source to have an angle of divergence that is approximate to that of the reference light utilized upon recording the image. For this reason, when an image is reproduced from the hologram or the holographic stereogram, the type of light source for irradiating the reproducing light should be subjected to a certain limitation or the layout of the light source should also be subjected to a certain limitation in terms of an optical system.

When the reproducing light are incident upon the hologram or the holographic stereogram, a wave front of rays of an object light upon recording the image can be reproduced. When the viewer looks at the hologram of the holographic stereogram with both of his or her eyes, he or she can observe a 3D image such as of a cubic object. Moreover, the hologram or the holographic stereogram can have a series of time-sequential images recorded thereon. Therefore, it becomes possible for the hologram or the holographic stereogram to display not only a still 3D image but also a series of time-sequential images.

However, when an image is reproduced on the hologram or the holographic stereogram, in order for the viewer to be able to observe the reproduced image, the viewpoint of the viewer has to move in the parallax direction with respect to the hologram or the holographic stereogram. That is, the viewer has to move to shift his or her viewpoint for observing the reproduced image. For this reason, the reproduced image observed by the viewer on the hologram or the holographic stereogram will be determined depending on the arbitrariness of the viewer. In particular, if the hologram or the holographic stereogram contains image data which provides a reproduced image changing in accordance with the changing viewpoint of the viewer, such as when a plurality of 3D images are recorded or when a series of time-sequential images are recorded, thus there is a problem of discrepancy in the variation of the reproduced image depending on arbitrariness of the viewer.

On the other hand, when the reproduced image is reproduced on the hologram or the holographic stereogram, if the angle of incidence of the reproducing light is shifted with respect to the angle of incidence of the reference light which is determined upon recording the image, a situation is brought about which is approximated to a situation in which the viewer moves his or her viewpoint. With this situation, the viewer can view a reproduced 3D image or a series of reproduced time-sequential images.

For example, the applicant of the present application has filed a preceding application which corresponds to Japanese Patent laid-open gazette No. 2001-142382. According to Japanese Patent laid-open gazette No. 2001-142382, there is disclosed an image reproducing apparatus equipped with a light source that can shift so that a predetermined angle of incidence relative to the hologram is maintained. The disclosure of Japanese Patent laid-open gazette No. 2001-142382 contains an example of a dumper mechanism which controls a lever, a spring and an urging force of the spring, as a light source shifting mechanism. This image reproducing apparatus includes a mechanism in which even if the lever is deviated from its initial position, the lever recovers its initial status owing to the urging force of the spring. That is, the light source is moved as the lever is moved.

However, the mechanism of the image reproducing apparatus can provide only a single reciprocal motion from a status in which the light source is moved apart from its initial position to a status in which the light source again recovers its initial status. For this reason, when the viewer tries to look in a repetitive manner at the reproduced image, which is provided by the image reproducing apparatus, the viewer is requested to carry out the lever moving action in a repetitive manner, which is a cumbersome operation for the viewer. Further, since the image reproducing apparatus requires a viewer to carry out the lever moving action in a repetitive manner, the mechanism suffers from damages or wear in mechanical components forming the mechanism.

SUMMARY OF THE INVENTION

The present invention has been conceived in view of the above situation of the related art. Thus, it is preferable to provide an image reproducing apparatus and an image illuminating apparatus having a simple structure in which reproducing light can be displaced in their angle of incidence with respect to a hologram or a holographic stereogram so that a reproduced image can be repeatedly observed by a viewer without moving his or her viewpoint.

According to a first preferred embodiment of the present invention, in order to alleviate the above-identified problems, there is provided an image reproducing apparatus for reproducing image data recorded on a hologram or a holographic stereogram by a light exposure process, including display means for holding the hologram or holographic stereogram and displaying an image thereon, light source means for irradiating reproducing light for reproducing the image data in the hologram or holographic stereogram that is held by the display means, power supply for supplying a driving power to at least the light source means, and supporting means for supporting the light source means and swingably moving the light source means in a repetitive manner with respect to the hologram or the holographic stereogram which is held by the display means so that a reciprocal motion is performed on the irradiating position of the reproducing light with respect to the hologram or the holographic stereogram.

According to the above arrangement of the image reproducing apparatus, the light source means is swingably moved in a repetitive manner with respect to the hologram or the holographic stereogram so that a reciprocal motion is performed on the irradiating position of the reproducing light with respect to the hologram or the holographic stereogram that is held by the display means. Therefore, the relative reciprocal motion can be maintained between the light source means and the hologram or the holographic stereogram for a predetermined period of time. Accordingly, the viewer can observe in a repetitive manner a reproduced image created in the hologram or the holographic stereogram without having to move his or her viewpoint in spite of the fact that the image reproducing apparatus has a simple structure and consumes relatively small electric power.

According to a second preferred embodiment of the present invention, in order to alleviate the above-identified problems, there is provided an image illuminating apparatus for irradiating reproducing light on a hologram or a holographic stereogram to reproduce image data recorded on the hologram or the holographic stereogram by a light exposure process, including light source means for irradiating reproducing light, power supply for supplying a driving power to at least the light source means, and supporting means for supporting the light source means and swingably moving in a repetitive manner the light source means with respect to the hologram or the holographic stereogram so that a reciprocal motion is performed on the irradiating position of the reproducing light with respect to the hologram or the holographic stereogram.

According to the above arrangement of the image illuminating apparatus as the second preferred embodiment of the present invention, the light source means is swingably moved in a repetitive manner with respect to the hologram or the holographic stereogram so that a reciprocal motion is performed on the irradiating position of the reproducing light with respect to the hologram or the holographic stereogram. Therefore, the relative reciprocal motion can be maintained between the light source means and the hologram or the holographic stereogram for a predetermined period of time. Accordingly, the viewer can observe in a repetitive manner a reproduced image created in the hologram or the holographic stereogram without having to move his or her viewpoint in spite of the fact that the image reproducing apparatus has a simple structure and consumes relatively small electric power.

According to a third preferred embodiment of the present invention, there is provided an image reproducing apparatus for reproducing image data recorded on a hologram or a holographic stereogram by a light exposure process, including display means for holding the hologram or holographic stereogram and displaying an image thereon, light source means for irradiating reproducing light for reproducing the image data in the hologram or holographic stereogram which is held by the display means, power supply for supplying a driving power to at least the light source means, supporting means for supporting the light source means and rotatably or turnably moving the display means in a repetitive manner with respect to the light source means so that a reciprocal motion is performed on the irradiating position of the reproducing light with respect to the hologram or the holographic stereogram which is held by the display means.

According to the above arrangement of the image reproducing apparatus as a third embodiment of the present invention, the display means is turnably moved in a repetitive manner with respect to the light source means so that a reciprocal motion is performed on the irradiating position of the reproducing light with respect to the hologram or the holographic stereogram that is held by the display means.

Therefore, the relative reciprocal motion can be maintained between the light source means and the hologram or the holographic stereogram for a predetermined period of time. Accordingly, the viewer can observe in a repetitive manner a reproduced image created in the hologram or the holographic stereogram without moving his or her viewpoint in spite of the fact that the image reproducing apparatus has a simple structure and consumes relatively small electric power.

BRIEF DESCRIPTION OF THE DRAWINGS

The above and other objects, features and advantages of the present invention will become more apparent to those skilled in the art from the following description of the presently preferred exemplary embodiments of the invention taken in conjunction with the accompanying drawings, in which:

FIG. 4A shows a schematic frontal view of the image reproducing apparatus placed in an initial status to which reference is made for describing an action of a supporting unit included in the image reproducing apparatus, according to a preferred embodiment of the present invention;

FIG. 4B shows a schematic frontal view of an image reproducing apparatus placed in a status of rotation in the left direction to which reference is made for describing the action of the supporting unit included in the image reproducing apparatus, according to a preferred embodiment of the present invention;

FIG. 4C shows a schematic frontal view of the image reproducing apparatus placed in a status of rotation in the right direction to which reference is made for describing the action of the supporting unit included in the image reproducing apparatus, according to a preferred embodiment of the present invention;

FIG. 18 shows a schematic set of schematic diagrams for describing the relationship between a pulse signal generated from a swing motion detecting unit provided in the image reproducing apparatus and a pulse signal generated from a monostable multivibrator of the light source unit provided in the image reproducing apparatus, according to a preferred embodiment of the present invention;

FIG. 19 shows a schematic set of schematic diagrams for describing the relationship between a plurality of pulse signals continuously generated from the swing motion detecting unit and a pulse signal generated from the monostable multivibrator of the light source unit, according to a preferred embodiment of the present invention;

FIG. 26 shows a schematic diagram for describing a conventional method of fabricating a holographic stereogram.

DETAILED DESCRIPTION OF THE PREFERRED EMBODIMENTS

Figure 1:
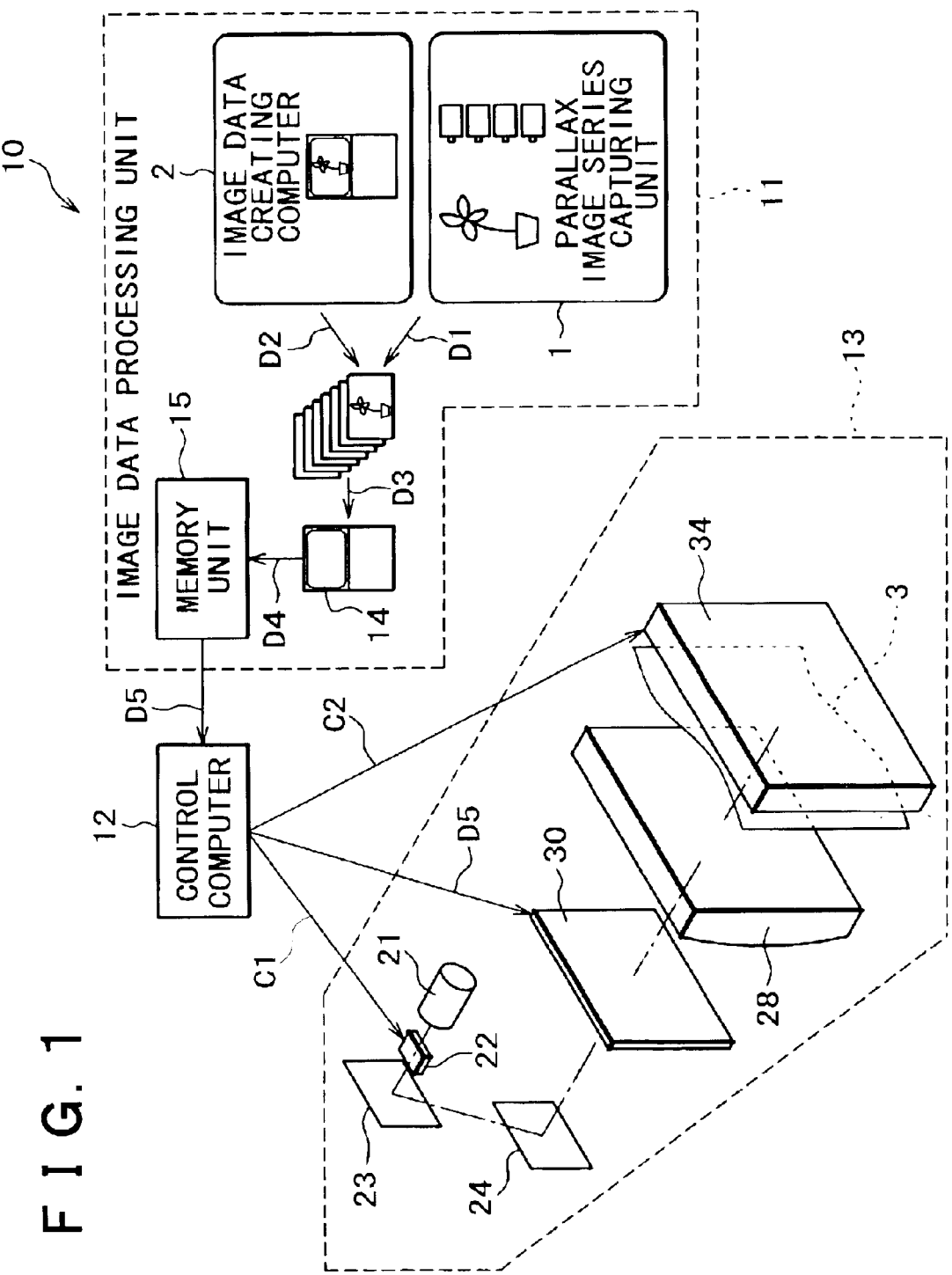
FIG. 1 shows a schematic diagram for describing an overall arrangement of a holographic stereogram fabricating apparatus for fabricating a holographic stereogram.

Preferred embodiments of the present invention will be hereinafter described with reference to the drawings.

Each of the embodiments described hereinafter is an image reproducing apparatus for reproducing 3D information, time-sequential video information and so on recorded on a hologram or a holographic stereogram by a light exposure process. The image reproducing apparatus includes an arrangement for realizing a reciprocal motion on the irradiating position of reproducing light with respect to the hologram or the holographic stereogram in a repetitive manner, whereby an image recorded on the hologram or the holographic stereogram can be reproduced. In more specific terms, the subject image reproducing apparatus introduces therein an arrangement in which a light source is swingably moved in a repetitive manner with respect to the hologram or the holographic stereogram by using a so-called pendulum principle, whereby a reciprocal motion is performed on the irradiating position of the reproducing light with respect to the hologram or the holographic stereogram. Alternatively, the subject image reproducing apparatus introduces therein an arrangement in which the hologram or the holographic stereogram is turnably moved in a repetitive manner with respect to the light source by using a torsion pendulum principle, whereby a reciprocal motion is performed on the irradiating position of the reproducing light with respect to the hologram or the holographic stereogram. According to the arrangement of the image reproducing apparatus, by using the above-described pendulum principle, a relative reciprocal motion can be performed between the light source and the hologram or the holographic stereogram for a predetermined period of time. Also, according to the arrangement of the image reproducing apparatus, an electric power of several milliwatts or below, for example, is sufficient for supplying a driving system of the pendulum and maintaining the above-described reciprocal motion. Description will be made below of an image reproducing apparatus for reproducing an image recorded on a holographic stereogram in order to make the explanation more clear.

Initially, prior to the description about the image reproducing apparatus, a holographic stereogram fabricating apparatus for fabricating a holographic stereogram will be described. The holographic stereogram as a matter of description is one in which a plurality of strip-like element holograms are recorded on a single sheet of hologram recording medium by a light exposure process so that a holographic stereogram having parallax information in the lateral direction is fabricated. However, it is needless to say that the holographic stereogram fabricating apparatus may be one in which a plurality of dot-like element holograms are recorded on a single sheet of hologram recording medium by a light exposure process so that a holographic stereogram having parallax information in the lateral direction and the vertical direction is fabricated.

As shown in FIG. 1, a holographic stereogram fabricating apparatus 10 is one in which a holographic stereogram image is recorded on a hologram recording medium 3 made of a photosensitive film by a light exposure process. The holographic stereogram fabricating apparatus 10 is arranged to include an image data processing unit 11 for performing certain processing on image data as an object of the recording by the light exposure process, a control computer 12 for wholly controlling the holographic stereogram fabricating apparatus, and a holographic stereogram fabricating unit 13 having an optical system for fabricating the holographic stereogram.

The image data processing unit 11 includes at least an image processing computer 14 and a memory unit 15. A parallax image series image capture unit 1 having a multi-eye camera, a moving camera or the like generates captured image data D1 containing parallax information. Also, an image data creating computer 2 creates computer image data D2 containing parallax information. Then, parallax image data series D3 is created based on the captured image data D1 and the computer image data D2, and the resulting image data are supplied to the image processing computer 14.

The captured image data D1 are image data including a plurality of sets of image data obtained, for example, by synchronized image capture by a multi-lens camera or a continuous image capture by a moving imaging apparatus such as a camera, for example. Each of the image data sets constituting the captured image data D1 contain parallax information among them. Also, the computer image data D2 includes a plurality of sets of image data created as CAD (Computer Aided Design) or CG (Computer Graphics). Each of the image data sets constituting the computer image data D2 contains parallax information.

The image data processing unit 11 performs a predetermined image processing for holographic stereogram on the parallax image data series D3 based on the captured image data D1 and/or the computer image data D2 by using the image processing computer 14. Thus, hologram image data D4 can be created. The hologram image data D4 is temporarily stored in the memory unit 15 formed of a memory or a hard disk unit or the like. As will be described later on, when the element hologram images are recorded on the hologram recording medium 3 by the light exposure process, the image data processing unit 11 sequentially reads element hologram image data D5 of each image from the hologram image data 4 which are stored in the memory unit 15, and then the image data processing unit 11 supplies the element hologram image data 5 to the control computer 12.

The control computer 12 controls the holographic stereogram fabricating unit 13 so that an element display image based on the element hologram image data D5 supplied from the image data processing unit 11 is sequentially recorded by a light exposure process on the hologram recording medium 3 provided at part of the holographic stereogram fabricating unit 13 as a strip-like element hologram. At this time, as will be described later on, the control computer 12 controls each mechanism of the holographic stereogram fabricating unit 13.

The holographic stereogram fabricating unit 13 is constructed in such a manner that each member constituting the optical system is provided and supported on a supporting board (optical surface plate) not shown and this supporting board is also supported in a unit housing through a dumper or the like, also not shown. The holographic stereogram fabricating unit 13 is arranged so as to include an incident optical system, an object optical system and a reference optical light as optical systems of the holographic stereogram fabrication. The holographic stereogram fabricating apparatus 10 introduces therein the hologram recording medium as a photosensitive material. Therefore, the unit housing has such a structure that at least all of the optical systems are insulated from external light.

Figure 2A:
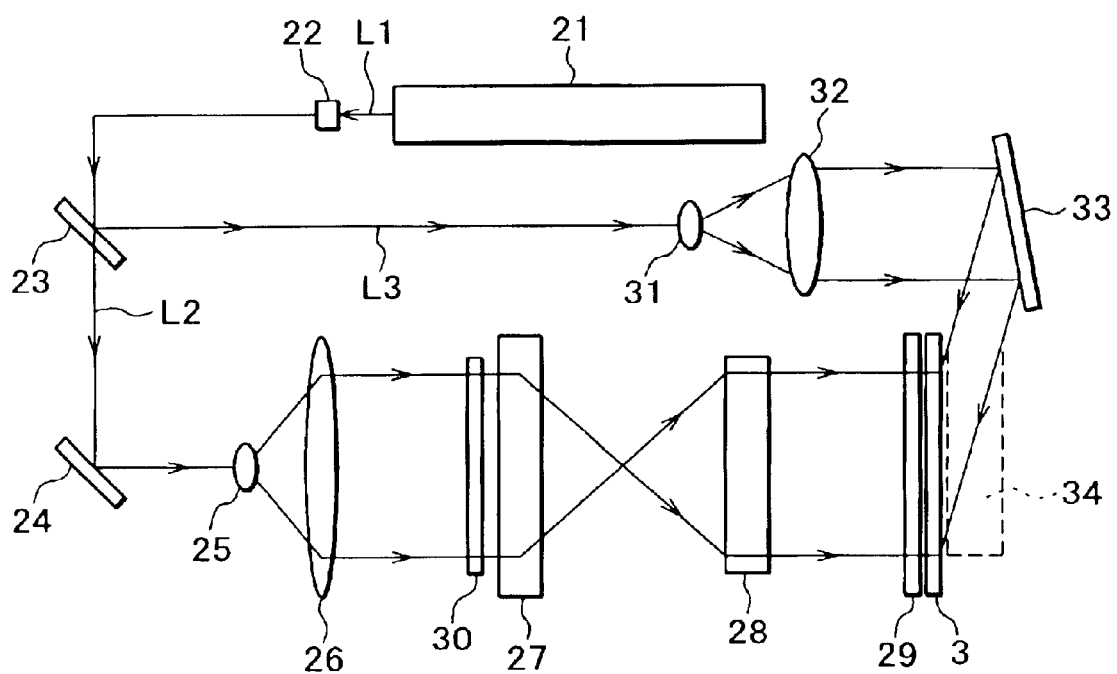
FIG. 2A shows a schematic front view of an optical system of the holographic stereogram to which reference is made for describing an optical system of a holographic stereogram fabricating apparatus, according to a preferred embodiment of the present invention.

As shown in FIG. 2A, the holographic stereogram fabricating unit 13 is arranged to include, as the incident optical system, a laser light source 21 emitting rays of laser light having a predetermined wavelength, a shutter mechanism 22 disposed on an optical axis of laser light L1 from the laser light source 21 for selectively opening or closing the shutter so that the laser light L1 can go to the subsequent stage or be prevented from going to the same, and a half mirror 23 for splitting the laser light L1 into an object light L2 and a reference light L3.

The laser light source 21 may include a laser device such as a semiconductor-exited YAG laser device capable of emitting the laser light L1 having a single wavelength and good coherence, a water-cooled argon ion laser device or a water-cooled krypton laser device.

The shutter mechanism 22 is controlled for opening or closing by a control signal C1 generated from the control computer 12 in response to an output timing of the element hologram image data D5. Thus, the laser light L1 can be allowed to go to a subsequent stage in the optical system or be prevented from going to the subsequent stage in the optical system.

The half mirror 23 splits the incident laser light L1 into a penetrating beam and a reflected beam. The penetrating beam of the incident laser light L1 is utilized as the object light L2 while the reflected beam of the same is utilized as the reference light L3. The object light L2 and the reference light L3 are led to the object optical system and the reference optical system which are provided in the subsequent stage, respectively.

Although not shown, the incident optical system may be arranged to include a mirror or the like in order that the traveling direction of the laser light L1 is properly changed and optical path lengths of the object light L2 and the reference light L3 are coincident. Further, the shutter mechanism 22 may be arranged in such a manner that a shutter piece is mechanically driven. Alternatively, the shutter mechanism 22 may include an electronic shutter utilizing an AOM (Acousto-Optic Modulation). In other words, the shutter mechanism 22 may be arranged in any manner so long as the mechanism can selectively open or close the optical path of the laser light L1.

Figure 2B:
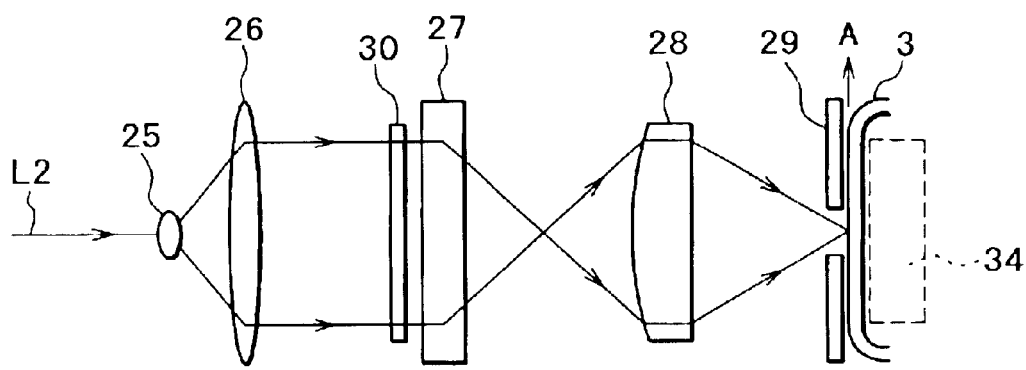
FIG. 2B shows a schematic plan view of the optical system of the holographic stereogram to which reference is made for describing the optical system of the holographic stereogram fabricating apparatus, according to a preferred embodiment of the present invention.

As shown in FIGS. 2A and 2B, the holographic stereogram fabricating unit 13 includes, as optical components of the object optical system, a mirror 24, a spatial filter 25, a collimator lens 26, a projection lens 27, a cylindrical lens 28, a mask 29 and so on. These optical components are arrayed in series from the input side along the optical axis of the optical system.

The mirror 24 reflects the object light L2 penetrating through the half mirror 23. The object light L2 reflected by the mirror 24 is led to the spatial filter 25.

The spatial filter 25 includes a convex lens and a pin hole. Owing to the spatial filter 25, the object light L2 reflected by the mirror 24 is diverged in an isotropic manner so as to correspond to the width of the display screen of a translucent liquid crystal display 30 which will be described later on.

The collimator lens 26 makes the object light L2 diverged by the spatial filter 25 into parallel rays of light and leads the light into the translucent liquid crystal display 30.

The projection lens 27 slightly diverges the object light L2 and projects the light onto the cylindrical lens 28. Since the projection lens 27 slightly diverges the object light L2, the image quality of the fabricated holographic stereogram will be improved.

The cylindrical lens 28 collimates the parallel rays of object light L2 in the lateral direction.

The mask 29 is arranged to have a strip-like shaped aperture. The mask 29 allows part of the rays of the object light L2 collimated by the cylindrical lens 28 to pass through the aperture and makes the passing rays of the object light L2 incident on the hologram recording medium 3.

In addition, the object optical system is arranged to have the translucent liquid crystal display 30 provided between the collimator lens 26 and the projection lens 27. The translucent liquid crystal display 30 displays sequentially the element hologram images based on the element hologram image data D5 supplied from the control computer 12. The control computer 12 supplies a driving signal C2 to a recording medium feeding mechanism 34, which will be described later on, of the hologram recording medium 3 in response to an output timing of the element hologram image data D5. Thus, the recording medium feeding mechanism 34 can be controlled in its operation and the hologram recording medium 3 feeding operation can be properly controlled.

In the above-described object optical system, when the incident optical system splits the laser light L1 into the object light L2 and the reference light L3 and a resultant thin beam-like object light L2 is incident onto the object optical system, the object light L2 is diverged by the spatial filter 25 and formed into parallel rays of light by the collimator lens 26 when the parallel rays of light are incident into the collimator lens 26. Further, in the object optical system, the object light L2 led to the translucent liquid crystal display 30 through the collimator lens 26 is subjected to an image modulation in accordance with the element hologram image displayed on the translucent liquid crystal display 30. Thereafter, the object light L2 is led to the cylindrical lens 28 through the projection lens 27. In the object optical system, when the shutter mechanism 22 opens to allow the rays of light to pass through the shutter mechanism 22, the object light L2 having undergone the image modulation is led to the hologram recording medium 3 through the aperture of the mask 29. Thus, the object light L2 having undergone the image modulation corresponding to the element hologram image can be recorded thereon by the light exposure process.

In addition, the holographic stereogram fabricating unit 13 includes, as optical components of the reference optical system, a spatial filter 31, a collimator lens 32 and a mirror 33. These optical components are arranged in series from the input side along the optical axis of the optical system.

Unlike the spatial filter 25 of the object optical system described above, the spatial filter 31 includes a cylindrical lens and a slit, for example. The reference light L3 deriving from the reflection and splitting of the half mirror 23 is diverged so that the rays of reference light L3 are formed to have a predetermined width. In more specific terms, the rays of reference light L3 are diverged in a one dimensional direction so that the predetermined width thereof corresponds to the display width of the translucent liquid crystal display 30.

The collimator lens 32 collimates the rays of reference light L3 diverged by the spatial filter 31 so that the rays of reference light L3 are made into parallel rays.

The mirror 33 reflects the rays of reference light L3 so that the reference light L3 is led into the back face of the hologram recording medium 3 and made incident into the same.

As has been described above, the object light L2 deriving from the splitting of the half mirror 23 travels a certain distance in one of the optical systems, i.e., the object optical system, and the reference light L3 deriving from the reflection on the half mirror 23 travels a certain distance in other optical system, i.e., the reference optical system. In the arrangement of the holographic stereogram fabricating unit 13 having the above-described optical systems, the length of the optical path on which the object light L2 travels is substantially identical to the length of the optical path which the reference light L3 travels. Accordingly, coherence between the object light L2 and the reference light L3 can be improved in the holographic stereogram fabricating unit 13, with the result that it becomes possible to fabricate a holographic stereogram which can provide a clearer reproduced image.

The holographic stereogram fabricating apparatus 10 is arranged to include a recording medium feeding mechanism 34 which can feed intermittently the hologram recording medium 3 in a direction indicated by an arrow "A" in FIG. 2B by an amount of one element hologram.

The recording medium feeding mechanism 34 moves the hologram recording medium 3 intermittently in accordance with a driving signal C2 which is supplied from a control computer 12. Also, in the holographic stereogram fabricating apparatus 10, the above-described shutter mechanism 22 is driven in accordance with the control signal C1 supplied from the control computer 12 in an interlocking relation with the motion of the recording medium feeding mechanism 34. Thus, the laser light L1 can be selectively allowed to pass through the shutter mechanism 22.

In the holographic stereogram fabricating apparatus 10, the control computer 12 supplies the driving signal C2 corresponding to a single element hologram to the recording medium feeding mechanism 34 each time image recording by a light exposure process is completed for one element image amount. In response to the driving signal C2 supplied from the control computer 12, the recording medium feeding mechanism 34 moves the hologram recording medium 3 by an amount corresponding to one element hologram along the feeding path, and stops the hologram recording medium 3 at a desired position so that part of the medium which has not yet been exposed faces the aperture of the mask 29. The holographic stereogram fabricating apparatus 10 has an arrangement, which can swiftly suppress any vibration even if the vibration is brought about in the hologram recording medium 3 due to the motion of the hologram recording medium 3. In such case, the hologram recording medium 3 is made of a long strip-like photosensitive film. Although not shown, a film cartridge capable of providing an inner space entirely kept in a light insulating status may be provided, and this long strip-like photosensitive film may be housed within the film cartridge so that the film is wound around a feeding roll turnably provided within the film cartridge. When the film cartridge is loaded on the holographic stereogram fabricating apparatus 10, the hologram recording medium 3 can be fed out from the cartridge into the holographic stereogram fabricating apparatus 10, and the film is subjected to the feeding movement along the feeding path by the recording medium feeding mechanism 34.

In the holographic stereogram fabricating apparatus 10, when the shutter mechanism 22 takes a shutter opening status, the object light L2 having undergone the image modulation is led to the front face of the hologram recording medium 3 and made incident on the same while the reference light L3 is led to the back face of the hologram recording medium 3 and made incident on the same, respectively. Thus, an interference fringe corresponding to the element hologram image can be recorded on the hologram recording medium 3 by the light exposure process. In the holographic stereogram fabricating apparatus 10, when the recording by the light exposure step for one element image is completed, the control computer 12 supplies the driving signal C2 to the recording medium feeding mechanism 34 so that the hologram recording medium 3 is fed by a predetermined distance and stopped at a desired position.

Although not shown, the holographic stereogram fabricating apparatus 10 is provided with an image capture fixing unit for carrying out image capture fixing processing which includes a step of ultraviolet irradiation processing performed on the hologram recording medium 3 and a step of heat treatment processing for placing the hologram recording medium 3 under an atmosphere at a predetermined temperature. Thus, the holographic stereogram image can be fixed on the hologram recording medium 3. When the hologram recording medium 3 has undergone the image capture fixing processing in the holographic stereogram fabricating apparatus 10, the hologram recording medium 3 having undergone the image capture fixing processing is cut into pieces sequentially so that each piece has a predetermined size corresponding to each holographic stereogram image. Thereafter, each piece is discharged to the outside as a single piece of holographic stereogram.

In this way, according to the arrangement of the holographic stereogram fabricating apparatus, the above-described fabrication steps are repeated and the long strip-like hologram recording medium 3 comes to have a plurality of holographic stereogram images sequentially recorded thereon by the light exposure process. Thus, a sheet of holographic stereogram having a holographic stereogram image recorded thereon by the light exposure process is fabricated.

Now description will be hereinafter made on an image reproducing apparatus for reproducing the holographic stereogram image such as a 3D image data, time sequential video information which are recorded by the light exposure process on the holographic stereogram fabricated by the holographic stereogram fabricating apparatus 10.

Initially, description will be made on an image reproducing apparatus in which a light source for irradiating reproducing light to the holographic stereogram is swingably moved in a repetitive manner so that a reciprocal motion is performed on the irradiating position of the reproducing light with respect to the holographic stereogram.

Figure 3A:
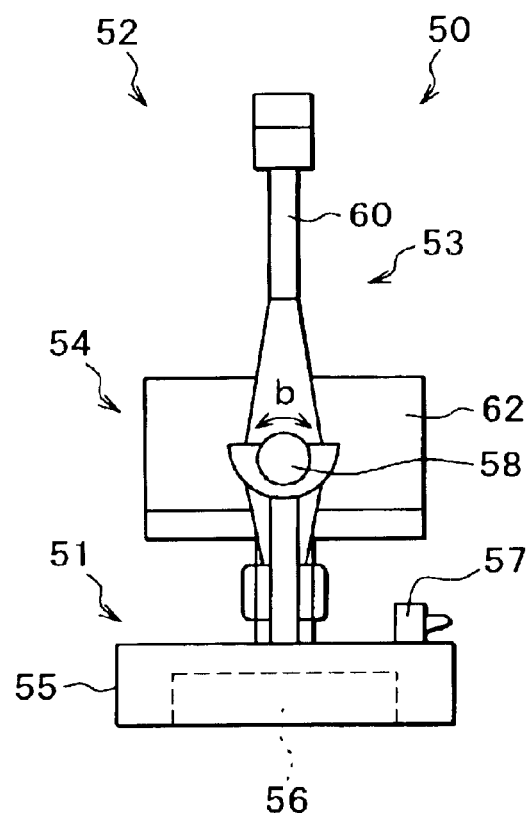
FIG. 3A shows a schematic frontal view of an image reproducing apparatus to which reference is made for describing an appearance of the image reproducing apparatus as an embodiment of the present invention in which a light source for irradiating reproducing light is swingably moved in a repetitive manner with respect to the holographic stereogram, according to a preferred embodiment of the present invention.
Figure 3B:
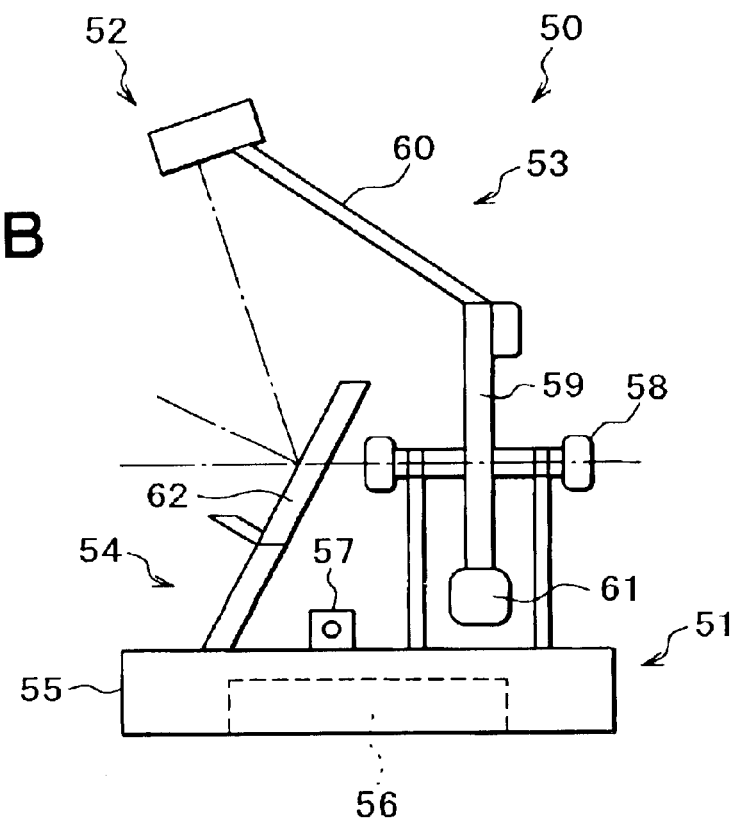
FIG. 3B shows a schematic side view of the image reproducing apparatus to which reference is made for describing an appearance of the image reproducing apparatus as the embodiment of the present invention in which the light source for irradiating reproducing light is swingably moved in a repetitive manner with respect to the holographic stereogram, according to a preferred embodiment of the present invention.

FIGS. 3A and 3B are schematic diagrams showing an external appearance of an image reproducing apparatus 50. As shown in FIGS. 3A and 3B, components constituting the image reproducing apparatus 50 can be roughly classified into four units, i.e., a power supply unit 51 as power supply having a power supply for supplying driving power and various electric circuits, a light source unit 52 as light source means having a light emitting diode or the like, a supporting unit 53 as supporting means for supporting the light source means 52, and a holographic stereogram display unit 54 as display means for holding the holographic stereogram and displaying the image recorded thereon.

Although not shown, the power supply unit 51 is provided with a power supply such as a battery and electric circuits for driving the light source unit 52 and the supporting unit 53, within the internal space of the base plate 55 of the image reproducing apparatus 50. Further, the power supply unit 51 is provided with a switch 57 for carrying out switching between ON mode and OFF mode of the power supply.

The light source unit 52 is attached to one end of a coupling arm 60, which will be described later on, of the supporting unit 53. The light source unit 52 irradiates rays of light having a predetermined wavelength which was utilized upon fabricating the holographic stereogram, as a reproducing ray of light. As will be described later on, the light source unit 52 may include a plurality of substantial point light sources such as light emitting diodes arrayed in a line fashion. Also, the light source unit 52 may include a linear or rod-like light source by a predetermined optical system. With such arrangements, the light source unit 52 can provide substantial parallel rays of light incident on the holographic stereogram which is held on the holographic stereogram display unit 54. In such case, the light source unit 52 is provided in such a manner that the angle of incidence of the reproducing light with respect to the holographic stereogram which is held on the holographic stereogram display unit 54 becomes substantially similar to the angle of incidence of the reference light utilized upon fabricating the holographic stereogram. It is needless to say that if it is requested to reproduce a color holographic stereogram, then the light source unit 52 may be equipped with light emitting diodes capable of emitting plural kinds of colors such as of red, green, or blue.

The supporting unit 53 is arranged to include a rotating member 59 which stands on the base plate 55 and is provided so as to be freely rotatable around the rotation axis of a supporting shaft 58 in the direction indicated by an arrow b in FIG. 3A, a coupling arm 60 attached to one end of the rotating member 59 so as to keep a predetermined angle with respect to the rotating member 59, and a weight 61 attached to the other end of the rotating member 59 for taking a counterbalance of the coupling arm 60. The supporting unit 53 is operated based on the driving power supplied from the power supply unit 51. In more specific terms, the rotating member 59 of the supporting unit 53 can be rotated from its initial status shown in FIG. 4A in the forward and reverse directions in a repetitive manner. Thus, the coupling arm 60 having the light source unit 52 attached thereto at one end thereof can be swingably moved in a repetitive manner at a swinging angle of about 90 degrees in the direction indicated by an arrow c in FIG. 4B and in the direction indicated by an arrow d in FIG. 4C.

The holographic stereogram display unit 54 is equipped with a holding member 62 for holding the holographic stereogram. FIG. 3B includes a side view of the holding member 62. As shown in FIG. 3B, the holding member 62 is attached to the holographic stereogram display unit 54 so that the member forms a certain angle with respect to the base plate 55. At this time, the holding member 62 is attached to the base plate 55 in such a manner that the angle of incidence of the reproducing light irradiated from the light source unit 52 with respect to the major surface of the base plate becomes substantially similar to the angle of incidence of the reference light utilized upon fabricating the holographic stereogram. A viewer will observe the holographic stereogram which is held by the holographic stereogram holding unit 54 and placed in the display mode.

In the image reproducing apparatus presenting the above-described appearance, if the supporting unit 53 is rotated around the rotation axis of the supporting shaft 58 in a repetitive manner, the light source unit 52 will be swingably moved in a repetitive manner. As a result, in the image reproducing apparatus 50, a reciprocal motion is performed on the irradiating position of the reproducing light with respect to the holographic stereogram which is held by the holographic stereogram display unit 54.

Now the arrangement of the image reproducing apparatus 50 will be hereinafter described in detail.

Figure 6:
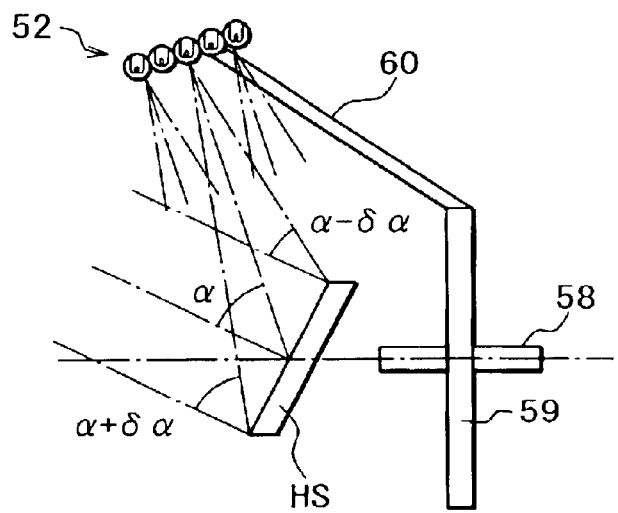
FIG. 6 shows a schematic side view of the main portion for describing the spatial relationship among the light source unit included in the image reproducing apparatus, the holographic stereogram held by the holographic stereogram display unit, and the rotating shaft of the supporting unit to which reference is made for describing a case where the angle of incidence of the reproducing light takes not only the same angle as that of reference rays of light but also a slightly different angle from the angle of incidence of the reference rays of light, according to a preferred embodiment of the present invention.
Figure 7:
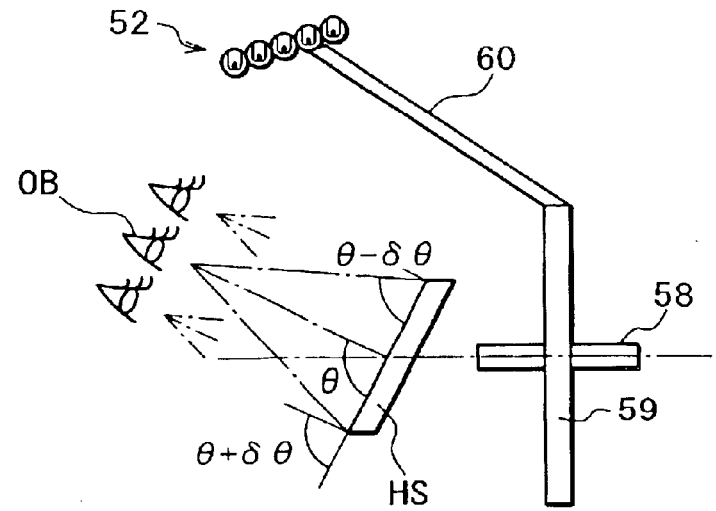
FIG. 7 shows a schematic side view of the main portion for describing the spatial relationship among the light source unit included in the image reproducing apparatus, the holographic stereogram held by the holographic stereogram display unit, and a rotating shaft of the supporting unit to which reference is made for describing a case where the view angle is not constant but it varies at a vicinity of a certain angle, according to a preferred embodiment of the present invention.

First, a spatial arrangement of the light source unit 52, the holographic stereogram held by the holographic stereogram display unit 54 and the rotating shaft of the supporting unit 53 included in the image reproducing apparatus 50 will be described with reference to FIGS. 5 to 7.

Figure 5:
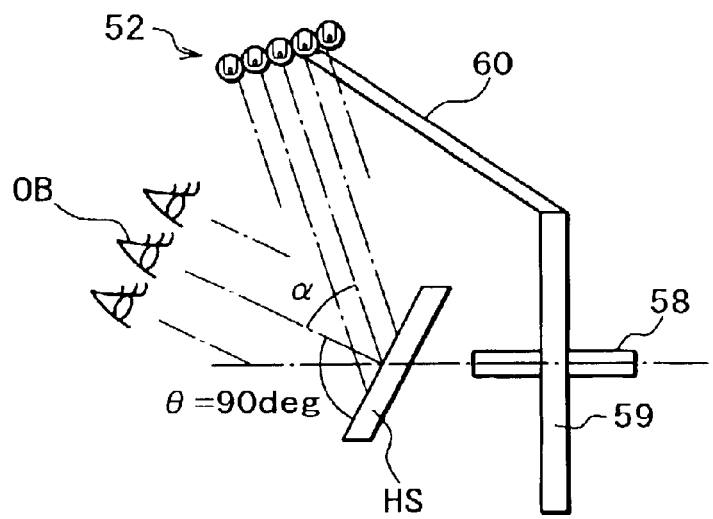
FIG. 5 shows a schematic side view of a main portion for describing a spatial relationship among the light source unit included in the image reproducing apparatus, the holographic stereogram held by a holographic stereogram display unit, and a rotating shaft of the supporting unit to which reference is made for describing an ideal angle of incidence of the reproducing light and a view angle, according to a preferred embodiment of the present invention.

In the image reproducing apparatus 50, as shown in FIG. 5, if an angle $\alpha$ is taken as an angle of incidence of the reproducing light incident upon a holographic stereogram HS held by the holographic stereogram display unit 54, it is desirable that the angle of incidence $\alpha$ coincides with an angle of incidence of the reference light utilized upon fabricating the holographic stereogram HS. Furthermore, if an angle $\theta$ is taken as a viewing angle formed between a viewer's viewing direction and the holographic stereogram HS as for example shown in the figure, it is desirable that the viewing angle $\theta$ coincides with an angle, i.e., 90 degrees, that is formed between the direction of the object light utilized upon fabricating the holographic stereogram HS and the holographic stereogram HS itself.

However, the holographic stereogram HS has a major surface which has a spatial size of a predetermined area. As a result, the light source unit 52 is separated from the holographic stereogram HS by a limited distance from the holographic stereogram HS and emits the reproducing light which diverge isotropically when they travel from the light source unit 52 to the holographic stereogram HS. For this reason, the holographic stereogram HS can receive the diverged rays of light with its whole major surface. As a result, as shown in FIG. 6, the angle of incidence of the reproducing light with respect to the holographic stereogram KS can take the angle $\alpha$ which is identical to the angle of incidence of the reference light but also the $\alpha \pm \delta \alpha$, which is approximate to the angle $\alpha$. Therefore, when a point light source is employed for the light source unit 52 upon reproducing the image recorded on the holographic stereogram HS, even if the view angle $\theta$ is constant, the angle of incidence of the reproducing light emitted from the point light source is dispersed, which fact will cause a change in diffraction efficiency relative to the reproducing light. As a result, there is a fear that the holographic stereogram image reproduced from the holographic stereogram HS comes to have a non-uniform image brightness.

Further, when a viewer observes the reproduced image reproduced by the image reproducing apparatus 50, as described above, it is desirable for the viewer to observe the image with the view angle $\theta$ kept constant, from a practical standpoint. However, as shown in FIG. 7, the viewer will observe the image with the view angle $\theta$ varying within a range of $\theta \pm \delta \theta$. In such case, although the dispersion in image brightness depends on the conditions of the object light utilized for the fabrication of the holographic stereogram HS, the holographic stereogram image reproduced from the holographic stereogram HS tends to have a non-uniform image brightness.

In order to avoid the above-described drawbacks, in the image reproducing apparatus 50, the light source unit 52 includes a plurality of point light sources such as light emitting diodes arrayed in a line fashion. Alternatively, the light source unit 52 includes a linear light source formed of a predetermined optical system. Thus, substantial parallel rays of light can be irradiated upon the holographic stereogram HS held by the holographic stereogram display unit 54. With these arrangements, in the image reproducing apparatus 50, it becomes possible to make the reproducing light incident upon the region having a predetermined area of the major surface of the holographic stereogram at the angle of incidence $\alpha$ and angles approximate to that angle. Accordingly, the holographic stereogram image reproduced from the holographic stereogram HS has substantially uniform image brightness.

If the image reproducing apparatus 50 employs the light source unit 52 as one including a plurality of point light sources arrayed in a line fashion, it is desirable for each of the point light sources to be arranged to irradiate reproducing light having a small diverging angle. That is, it is desirable for the image reproducing apparatus 50 to employ point light sources in each of which the above-described angle $\delta \alpha$ is small. If the image reproducing apparatus 50 employs such a point light source, it becomes possible to irradiate only rays of reproducing light having an angle of incidence approximate to the optimum angle of incidence a on the holographic stereogram HS, with the result that diffraction efficiency can be improved.

The above-described arrangements in the light source unit such as to array a plurality of point light sources in a line fashion or to employ a linear light source of a predetermined optical system will show and perform on a so-called Lippman hologram or a holographic stereogram containing parallax information of the lateral direction and the longitudinal direction. However, the above-described arrangements show a particularly advantageous effect when the holographic stereogram contains parallax information of only one of the lateral direction and the longitudinal direction.

Now an electric circuit arrangement of the image reproducing apparatus 50 will be described with reference to FIGS. 8 to 15. In the following description, description will be made on a case in which the light source unit 52 is equipped with a light emitting diode.

The image reproducing apparatus 50 includes the supporting unit 53 having at least a couple of supporting points $63_1$ and $63_2$ electrically insulated from each other. Electric power can be supplied from the power supply unit 51 to the light source unit 52 through the supporting points $63_1$ and $63_2$. That is, in the image reproducing apparatus 50, electric power can be supplied to the light source unit 52 by using the supporting points $63_1$ and $63_2$ as electric terminals.

In this image reproducing apparatus 50, the light source unit 52 employs a plurality of light emitting diodes $64_1$ and $64_2$ connected in parallel. In such case, the light emitting diode changes its luminous intensity depending on the value of electric current. In such case, the diode has such a characteristic that when the voltage applied to the diode exceeds a predetermined value, the value of the electric current increases abruptly. For this reason, the light emitting diode tends to exhibit an unstable turn-on-turn-off operation if the diode is subjected to any voltage control. Therefore, in this image reproducing apparatus 50, the electric current is controlled so that the luminous intensity of the diode can be kept constant.

Figure 8:
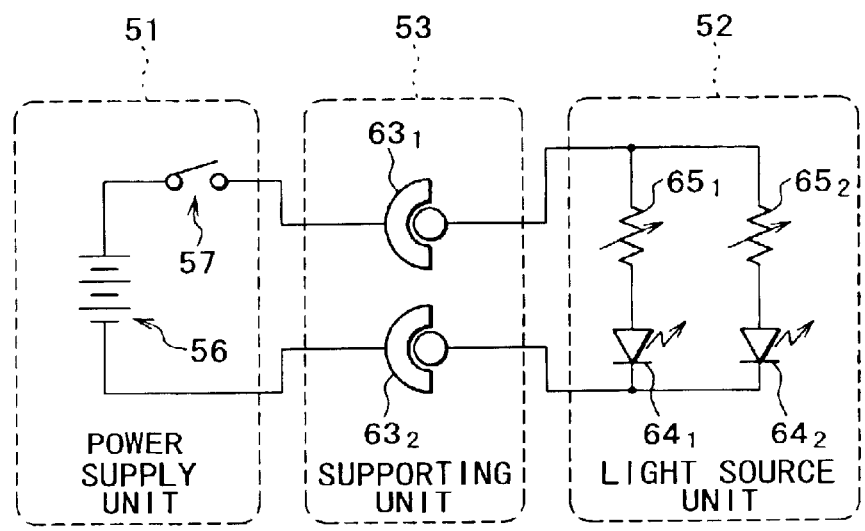
FIG. 8 shows a schematic diagram for describing an electric circuit arrangement of the image reproducing apparatus to which reference is made for describing a circuit arrangement provided with a variable resistor for controlling an electric current, according to a preferred embodiment of the present invention.

FIG. 8 shows a schematic preferable example of a circuit arrangement for realizing the above-mentioned constant current control in the image reproducing apparatus 50. As shown in FIG. 8, a pair of light emitting diodes $64_1$ and $64_2$ are provided as the light source unit 52, and a pair of variable resistors $65_1$ and $65_2$ are connected in series to the light emitting diodes $64_1$ and $64_2$, respectively. In such case, in the image reproducing apparatus 50, electric currents flowing through the light emitting diodes $64_1$ and $64_2$ can be limited to a desired level by the pair of variable resistors $65_1$ and $65_2$.

In the above image reproducing apparatus 50, the supporting points $63_1$ and $63_2$ are utilized as an electric terminal. Therefore, if any scratch is caused on or dust or the like is attached to the surface of the supporting points $63_1$ and $63_2$, then there is fear that the contact resistance at the supporting points $63_1$ and $63_2$ can be changed together with the operation of the supporting points $63_1$ and $63_2$. If such event is brought about in the image reproducing apparatus 50, the electric current flowing through the light emitting diodes $64_1$ and $64_2$ can be changed, such fact causing an unstable operation that the light emitting diodes $64_1$ and $64_2$ flicker unstably.

Figure 9:
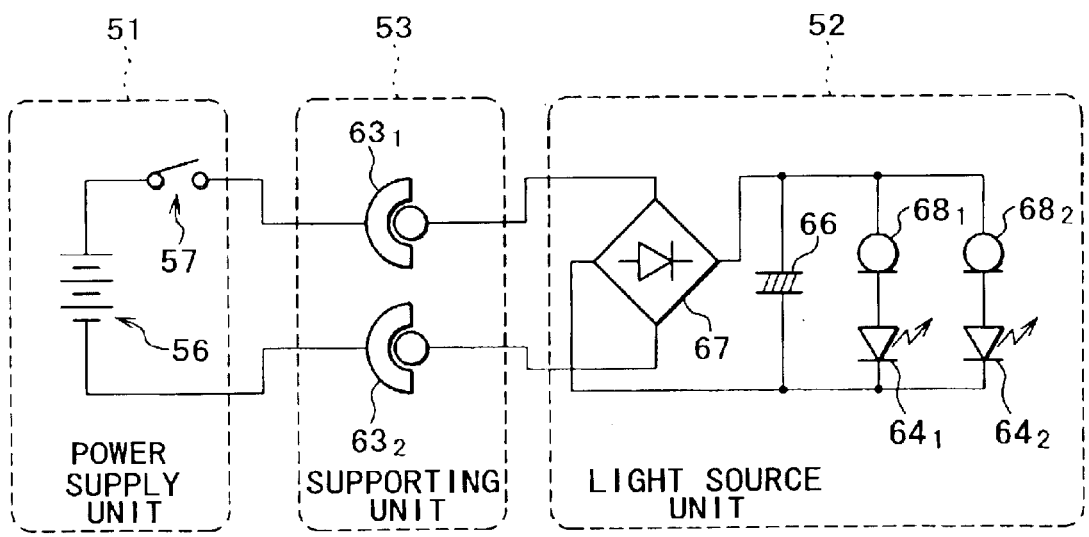
FIG. 9 shows a schematic diagram for describing an electric circuit arrangement of the image reproducing apparatus to which reference is made for describing a circuit arrangement provided with a smoothing circuit and a constant-current diode serving as a constant-current circuit, according to a preferred embodiment of the present invention.

FIG. 9 is a more improved example of electric circuit arrangement for the image reproducing apparatus 50. As shown in FIG. 9, a smoothing circuit 66 as smoothing means is preferably provided in parallel to the light emitting diodes $64_1$ and $64_2$ so that the rate of electric current flowing through the light emitting diodes $64_1$ and $64_2$ is made stable. While it is assumed that the smoothing circuit 66 is formed of an electrolytic capacitor, any electric components such as a secondary battery e.g., a lithium ion battery, nickel-cadmium battery and so on or a super capacitor can be replaced for the electrolytic capacitor as long as the component can accumulate a considerable amount of electric charge.

Further, the electric circuit arrangement of the image reproducing apparatus 50 may be additionally provided with a diode bridge 67 as a countermeasure against polarity change in the electrodes at the supporting unit 53.

Further, in the image reproducing apparatus 50, if the electric charge accumulating means such as the electrolytic capacitor is employed as the smoothing circuit 66, then there is a fear that the voltage applied from one end to the other upon discharging can be gradually decreased. Therefore, any countermeasure other than provision of the limiting resistors such as the variable resistors $65_1$ and $65_2$ shown in FIG. 8 is desirable in order that the rate of electric current flowing through the light emitting diodes $64_1$ and $64_2$ is kept constant. FIG. 9 shows one particularly desirable arrangement of a constant current circuit. As shown in FIG. 9, constant current circuit includes current regulate diodes (CRD) $68_1$ and $68_2$ connected in series to the light emitting diodes $64_1$ and $64_2$, respectively.

Figure 10:
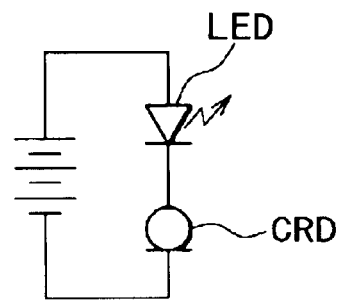
FIG. 10 shows a schematic diagram of an example of arrangement of the constant-current circuit in which there is shown a constant-current circuit having a single piece of constant current diode connected in series to a light emitting diode, according to a preferred embodiment of the present invention.
Figure 11:
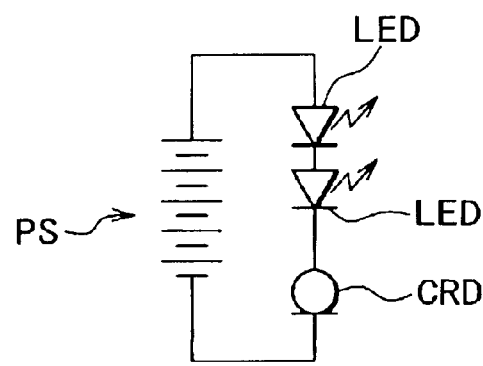
FIG. 11 shows a schematic diagram of an example of arrangement of the constant-current circuit in which there is shown a constant-current circuit having a single piece of constant current diode connected in series to a couple of light emitting diodes, according to a preferred embodiment of the present invention.
Figure 12:
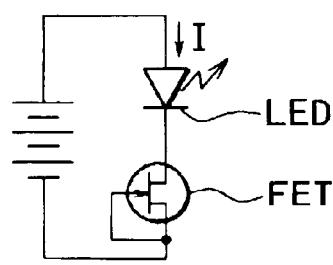
FIG. 12 shows a schematic diagram showing an example of arrangement of the constant-current circuit in which there is shown a constant-current circuit having an electrolytic capacitor connected in series to a light emitting diode, according to a preferred embodiment of the present invention.
Figure 13:
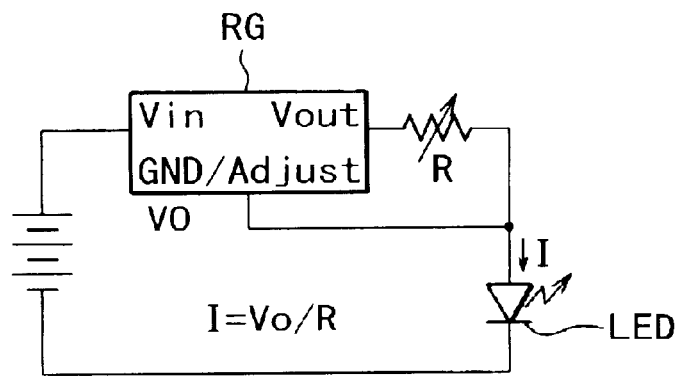
FIG. 13 shows a schematic diagram showing an example of arrangement of the constant-current circuit in which there is shown a constant-current circuit employing a three-terminal regulator and a variable resistor, according to a preferred embodiment of the present invention.
Figure 14:
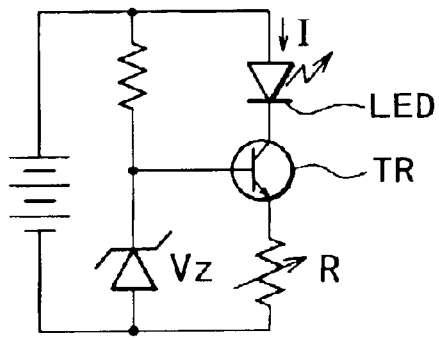
FIG. 14 shows a schematic diagram showing an example of arrangement of the constant-current circuit in which there is shown a constant-current circuit employing a single piece of transistor, according to a preferred embodiment of the present invention.
Figure 15:
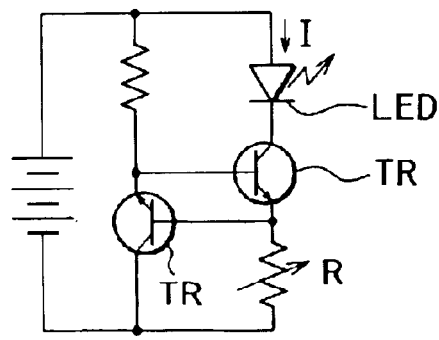
FIG. 15 shows a schematic diagram showing an example of arrangement of the constant-current circuit in which there is shown a constant-current circuit employing a couple of transistors, according to a preferred embodiment of the present invention.

FIGS. 10 and 11 are also schematic diagrams each showing another possible constant current circuit applicable to the image reproducing apparatus. As shown in FIG. 10, the constant current circuit has a current regulate diode CRD connected in series to the light emitting diode LED. FIG. 11 is a schematic diagram showing one preferable arrangement of the constant current circuit in which it is desired to connect a couple of light emitting diodes in series. As shown in FIG. 11, the power supply PS capable of applying twice the voltage is provided for driving the couple of light emitting diodes connected in series. FIG. 12 shows another example of the constant current circuit. As shown in FIG. 12, the electrolytic capacitor FET may be connected in series to the light emitting diode LED. FIG. 13 shows a schematic of another example of the constant current circuit. As shown in FIG. 13, a three-terminal regulator RG and a variable resistor R may be employed. Also, FIGS. 14 and 15 show still further examples of the constant current circuits. As shown in FIGS. 14 and 15, transistors TR may be employed.

According to the arrangement of the image reproducing apparatus 50, the light source unit 52 can be swingably moved in a repetitive manner with respect to the holographic stereogram so that a reciprocal motion is performed on the irradiating position of the reproducing light on the holographic stereogram. Therefore, the viewer can observe in a repetitive manner a reproduced image created in the holographic stereogram without moving the viewpoint in spite of the fact that the image reproducing apparatus has a simple structure.

Now description will be made on one modified improvement of the image reproducing apparatus 50 in which the light source unit 52 can be controlled in response to the swing motion of the supporting unit 53. In addition to the arrangement of the above-described image reproducing apparatus 50, this modification of the image reproducing apparatus includes means for detecting the swing motion of the supporting unit 53. Therefore, parts corresponding to those of the image reproducing apparatus 50 are identified by the same reference numerals, and further description thereof will be omitted.

Figure 16A:
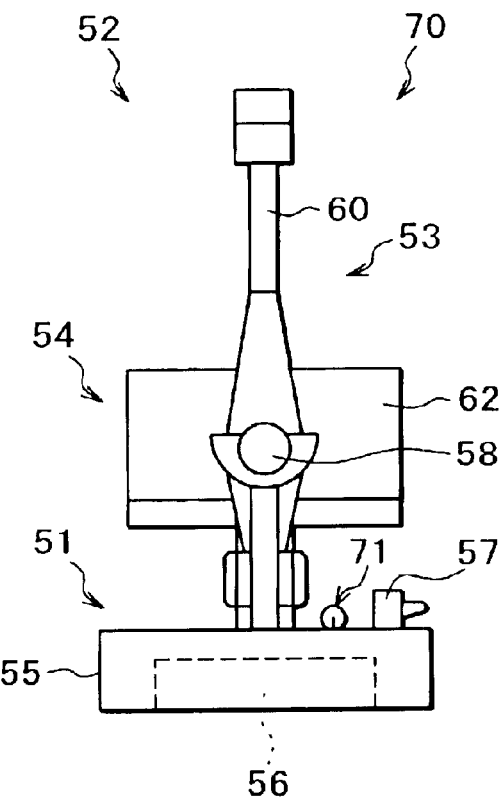
FIG. 16A shows a schematic frontal view of an image reproducing apparatus to which reference is made for describing an appearance of the image reproducing apparatus as another embodiment of the present invention in which a light source for irradiating reproducing light is swingably moved in a repetitive manner with respect to the holographic stereogram and means for detecting the swing motion of a supporting unit is a additionally provided, according to a preferred embodiment of the present invention.
Figure 16B:
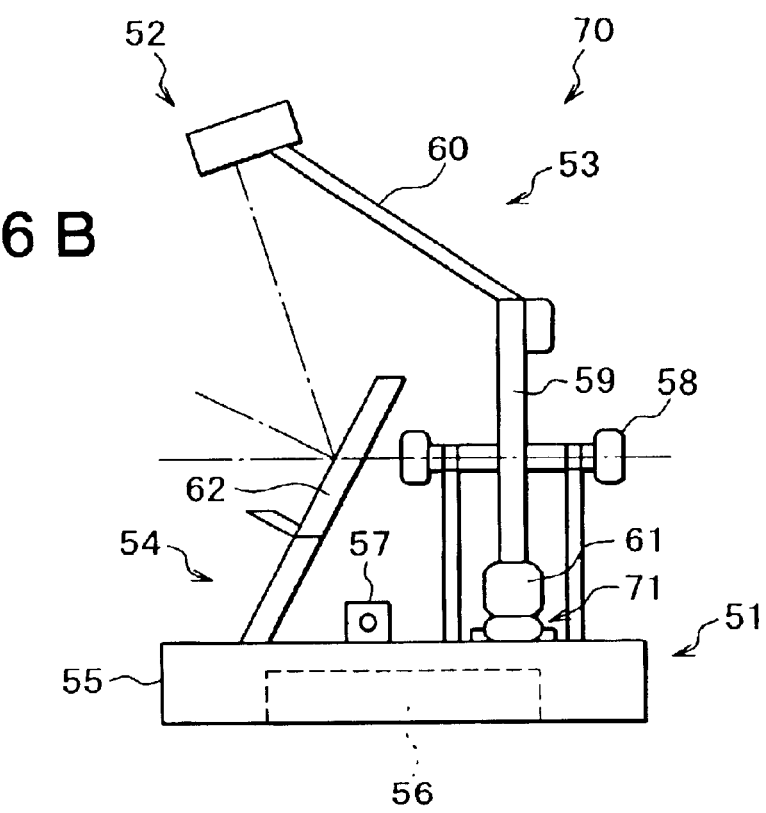
FIG. 16B shows a schematic side view of the image reproducing apparatus to which reference is made for describing an appearance of the image reproducing apparatus as another embodiment of the present invention in which the light source for irradiating reproducing light is swingably moved in a repetitive manner with respect to the holographic stereogram and means for detecting the swing motion of the supporting unit is additionally provided, according to a preferred embodiment of the present invention.

FIGS. 16A and 16B are schematic diagrams showing an external appearance of an image reproducing apparatus 70. As shown in FIGS. 16A and 16B, in addition to the above-described components, i.e., the power supply unit 51, the light source unit 52, the supporting unit 53, and the holographic stereogram display unit 54, the image reproducing apparatus 70 additionally includes a swing motion detecting unit 71 as swing motion detecting means for detecting the status of swing motion of the supporting unit 53.

The swing motion detecting unit 71 is disposed at a position on the extension of the longitudinal axis of the rotating member 59 of the supporting unit 53 placed in an initial mode, and also the swing motion detecting unit 71 is disposed on the base plate 55 of the power supply unit 51. As will be described later on, the swing motion detecting unit 71 supplies a control signal to the light source unit 52 in response to the change of magnetism caused by the swing motion of the supporting unit 53.

In the image reproducing apparatus 70 exhibiting the above-described external appearance, the swing motion detecting unit 71 detects the status of swing motion of the supporting unit 53, and the light source unit 52 is controlled based on the detected result.

Now an electric circuit arrangement of the image reproducing apparatus 70 will be described with reference to FIG. 17. In the following description, description will be made on a case in which the light source unit 52 is equipped with a light emitting diode.

The supporting unit 53 of the image reproducing apparatus 70 is equipped with a permanent magnet at part of the supporting unit 53. In the image reproducing apparatus 70, when the supporting unit 53 is swingably moved in the direction indicated by an arrow on the permanent magnet 72 in FIG. 17, the magnetic field of the permanent magnet 72 is changed. The swing motion detecting unit 71 of the image reproducing apparatus 70 detects the change in the magnetic field caused by the permanent magnet 72 so that the status of the swing motion of the supporting unit 53 is detected.

In more specific terms, in the image reproducing apparatus 70, the swing motion detecting unit 71 employs a reed switch 73 responsive to a magnetic field. In the image reproducing apparatus 70, when the permanent magnet 72 approaches the reed switch 73, the reed switch 73 turns on. In the image reproducing apparatus 70, when the reed switch 73 turns on, a single pulse is supplied to the light source unit 52. In the image reproducing apparatus 70, a method for detecting the status of swing motion of the supporting unit 53 is not limited to the above method, but any other method can be employed. However, the method for detecting the status of swing motion is desirably a non-contact system in which it is hard to give a dumping effect to the swing motion of the supporting unit 53. For example, the image reproducing apparatus 70 may employ a method using a magnet piece and a coil, a method using light such as with a photo-interrupter and so on, as a method for detecting the status of swing motion.

The image reproducing apparatus 70 is equipped with a monostable multivibrator 74 using an integrated circuit "74HC4538", for example, at the light source unit 52. In this image reproducing apparatus 70, when the swing motion detecting unit 71 supplies a pulse signal to the light source unit 52, the pulse signal functions as a trigger signal in the light source unit 52, so that the light emitting diodes $64_1$ and $64_2$ stay on for a predetermined period of time. In more specific terms, in the image reproducing apparatus 70, as shown in FIG. 18, when a pulse signal P1 supplied from the swing motion detecting unit 71 is inputted to the integrated circuit "74HC4538" of the monostable multivibrator 74 at a terminal A, then the integrated circuit "74HC4538" continuously generates a pulse signal P0 at a terminal Q with a time constant tw (=0.7·Cx·Rx) which is determined by the statistic capacity Cx of the capacitor C and the resistor value Rx of the resistor R provided in the monostable multivibrator 74. In the image reproducing apparatus 70, if a time period corresponding to the time constant tw elapses, then the light emitting diodes $64_1$ and $64_2$ are turned off.

In the image reproducing apparatus 70, as shown in FIG. 19, the swing motion detecting unit 71 continuously supplies the pulse signal P1 including a plurality of pulses to the light source unit 52 as far as the swing motion continues in the supporting unit 53. In the image reproducing apparatus 70, if the supporting unit 53 substantially stops the swing motion so that the swing motion detecting unit 71 does not detect the status of the swing motion, then the reed switch 73 is turned off. At this time, in the image reproducing apparatus 70, as shown in the same figure, if a time period corresponding to the time constant tw elapses after the light source unit 52 receives the last pulse of the pulse signal P1 from the swing motion detecting unit 71, then the light emitting diodes $64_1$ and $64_2$ are turned off. In other words, in the image reproducing apparatus 70, the pulse signal P0 goes to the energized status (high level) and keeps the status for the time period corresponding to the time constant tw each time the light resource unit 52 receives a pulse of the pulse signal P1 from the swing motion detecting unit 71. If the light source unit 52 receives the next pulse of the pulse signal P1 before the pulse signal P0 goes to the low level, then counting is again started on the time period corresponding to the time constant tw in response to the next pulse reception, and after counting the time period corresponding to the time constant tw, the light emitting diodes $64_1$ and $64_2$ are turned off.

As described above, according to the arrangement of the image reproducing apparatus 70, the swing motion detecting unit 71 detects the status of swing motion of the supporting unit 53, and the light source unit 52 is controlled based on the detected result. Further, if a viewer touches the supporting unit 53 to give a swing motion to the supporting unit 53, the light source unit 52 is turned on in response to the swing motion given by the viewer. If the predetermined time period is elapsed and/or the supporting unit 53 substantially stops its swing motion, making the swing motion in the supporting unit 53 not detectable, then the light source unit 52 is inactivated. Therefore, according to the arrangement of the image reproducing apparatus 70, the viewer need not carry out the switching between the ON-mode and OFF-mode of the light source unit 52, which fact brings an excellent advantage to the viewer. Furthermore, according to the arrangement of the image reproducing apparatus 70, the monostable multivibrator 74 consumes an electric current of about several hundreds $\mu A$, which value is considerably small as compared with a value of about 20 mA, which is an electric current consumed by a single piece of light emitting diode. Accordingly, it becomes possible to control the light source unit 52 at a relatively low electric power consumption level.

Figure 17:
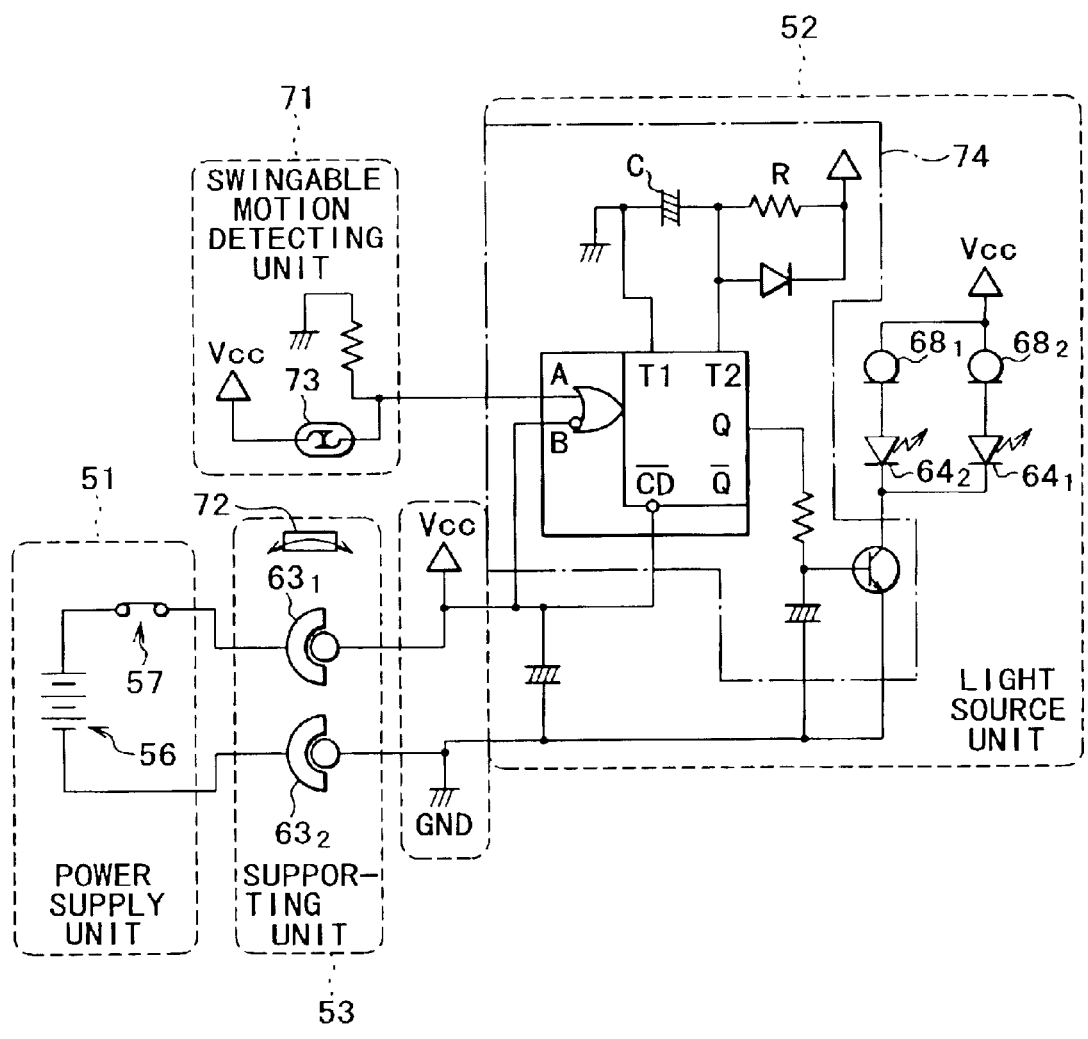
FIG. 17 shows a schematic diagram for describing an electric circuit arrangement of the image reproducing apparatus, according to a preferred embodiment of the present invention.

In the image reproducing apparatus 70, the circuit arrangements of the swing motion detecting unit 71 and the light source unit 52 are not limited to one shown in FIG. 17, but any modification can be made thereon depending on whether the pulse signal generated from the swing motion detecting unit 71 for a predetermined period of time or the same pulse signal is generated intermittently. Alternatively, any modification can be made thereon depending on how long a time period is elapsed after the swing motion becomes not detectable in the supporting unit 53 before turning off the light source unit 52. For example, in the image reproducing apparatus 70, the monostable multivibrator 74 may be replaced by a timer, or any software may be executed by a CPU (Central Processing Unit). Furthermore, a sequencer or the like may replace the arrangement of the monostable multivibrator 74.

Now description is made on one preferable improvement of the image reproducing apparatus 70 in which the swing motion of the supporting unit 53 is not performed by any action of the viewer but the swing motion is automatically started (self-starting) or activated by any external action, whereby the status of the swing motion continues for a predetermined period of time. In addition to the arrangement of the above-described image reproducing apparatus 70, this modification of the image reproducing apparatus includes means for driving the supporting unit 53. Therefore, parts corresponding to those of the image reproducing apparatus 70 are identified by the same reference numerals, and further description of such parts are omitted.

Figure 20A:
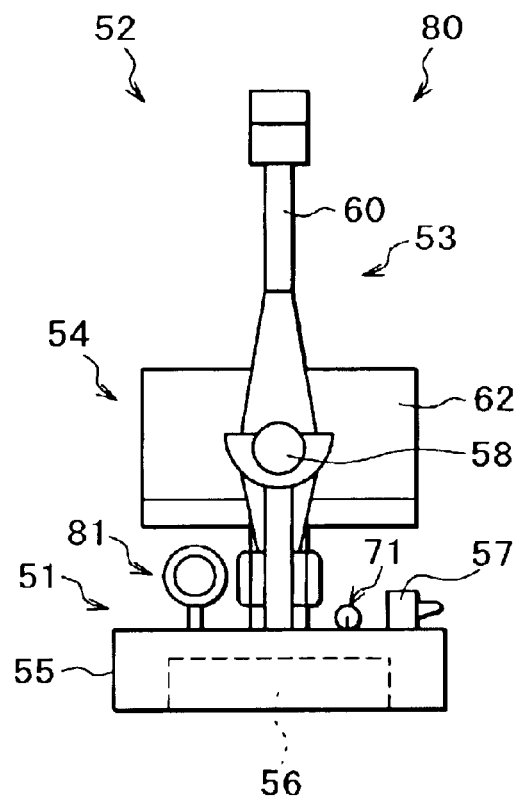
FIG. 20A shows a schematic frontal view of an image reproducing apparatus to which reference is made for describing an appearance of the image reproducing apparatus as another embodiment of the present invention in which a light source for irradiating reproducing light is swingably moved in a repetitive manner with respect to the holographic stereogram and means for driving a supporting unit is additionally provided, according to a preferred embodiment of the present invention.
Figure 20B:
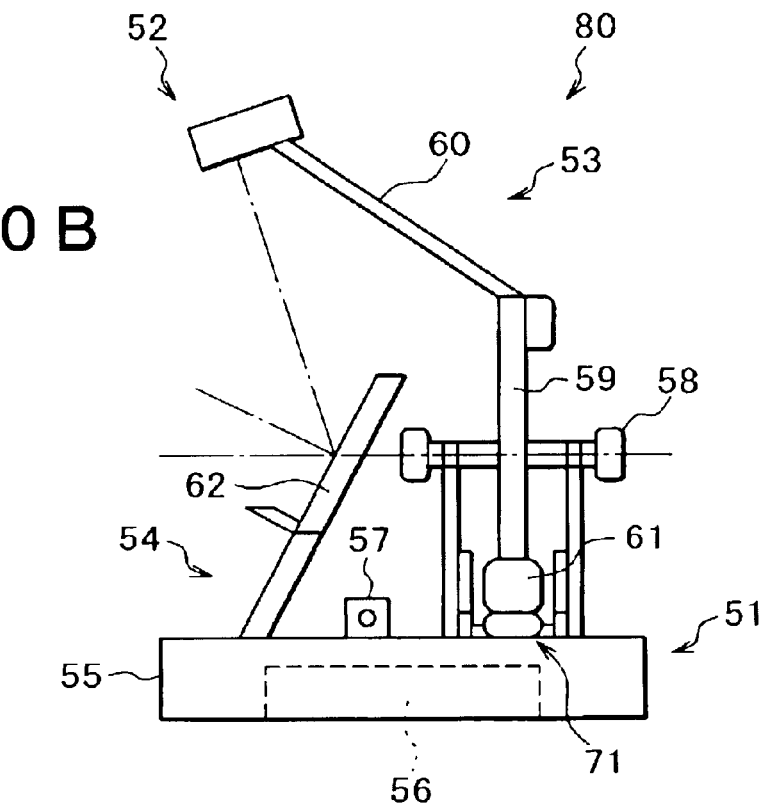
FIG. 20B shows a schematic side view of the image reproducing apparatus to which reference is made for describing an appearance of the image reproducing apparatus as another embodiment of the present invention in which the light source for irradiating reproducing light is swingably moved in a repetitive manner with respect to the holographic stereogram and the means for driving the supporting unit is additionally provided, according to a preferred embodiment of the present invention.

FIGS. 20A and 20B are schematic diagrams showing an external appearance of an image reproducing apparatus 80. As shown in FIGS. 20A and 20B, in addition to the above-described components, i.e., the power supply unit 51, the light source unit 52, the supporting unit 53, the holographic stereogram display unit 54, and the swing motion detecting unit 71, the image reproducing apparatus 80 additionally includes a swing motion performing unit 81 as swing motion performing means for performing swing motion on the supporting unit 53.

The swing motion performing unit 81 is a unit for performing a swing motion on the supporting unit 53. This swing motion performing unit 81 can be constructed by using a technology similar to that of a metronome, for example. As will be described later on, the swing motion performing unit 81 is arranged to include a coil or the like so that magnetic force can be performed on the lower end side of the supporting unit 53 to perform a swing motion on the supporting unit 53 in a self-starting manner or the swing motion is maintained during a predetermined period of time.

In the image reproducing apparatus 80 exhibiting the above-described external appearance, the swing motion detecting unit 71 detects the status of swing motion of the supporting unit 53, the light source unit 52 and the swing motion performing unit 81 are controlled based on the detected result, and the supporting unit 53 is controlled in its action.

Figure 21:
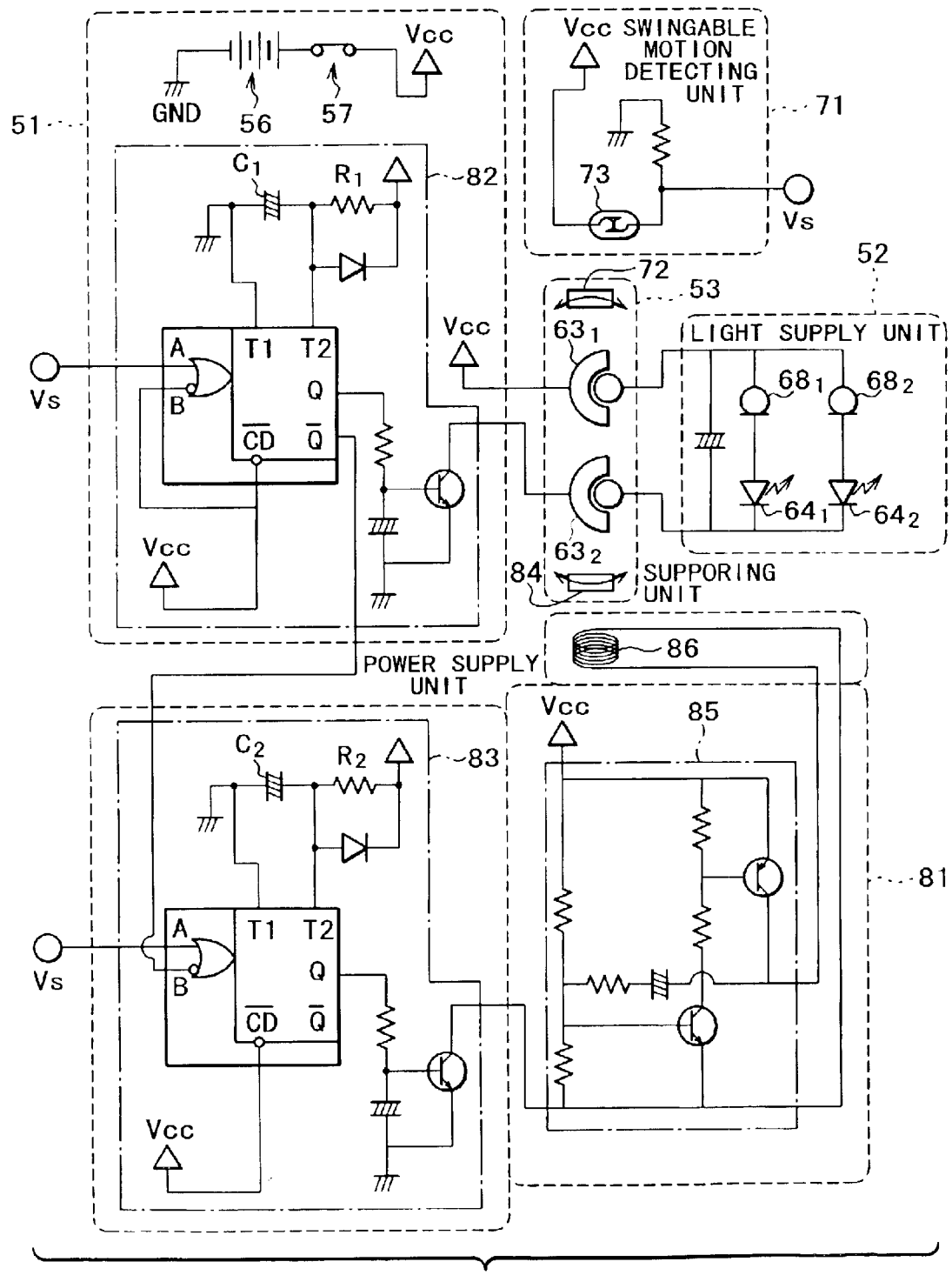
FIG. 21 shows a schematic diagram for describing an electric circuit arrangement of the image reproducing apparatus, according to a preferred embodiment of the present invention.

Now an electric circuit arrangement of the image reproducing apparatus 80 will be described with reference to FIG. 21. In the following description, description will be made on a case in which the light source unit 52 is equipped with a light emitting diode.

In the image reproducing apparatus 80, the power supply unit 51 has a monostable multivibrator 82 including the above-described integrated circuit "74HC4538". Also, the swing motion performing unit 81 has a monostable multi-vibrator 83.

In other words, in the image reproducing apparatus 80, similarly to the above-described image reproducing apparatus 70, the swing motion detecting unit 71 generates a pulse signal indicative of the result of detection of the status of swing motion, and when this pulse signal is supplied to the light source unit 52, this pulse signal serves as a trigger for turning the light emitting diodes 64₁ and 64₂ on and making the diodes stay on for a predetermined period of time. That is, in the image reproducing apparatus 80, the integrated circuit "74HC4538" continuously generates a pulse signal at a terminal Q-bar for a time constant corresponding to a time constant $tw_1$ $(=0.7\Box Cx_2\Box Rx_2)$ which is determined by the statistic capacity $Cx_1$ of the capacitor $C_1$ and the resistor value $Rx_1$ of the resistor $R_1$ provided in the monostable multivibrator 82. In the image reproducing apparatus 80, if the time period corresponding to the time constant $tw_1$ elapses after the swing motion status of the supporting unit 53 becomes incapable of detection, then the light emitting diodes 64₁ and 64₂ are turned off.

In the image reproducing apparatus 80, the pulse signal indicative of the detection result of the swing motion status generated from the swing motion detecting unit 71 can be utilized as a trigger for performing a swing motion on the supporting unit 53. That is, in the image reproducing apparatus 80, the integrated circuit "74HC4538" continuously generates a pulse signal at the terminal Q for a predetermined period of time corresponding to a time constant $tw_2$ $(=0.7\Box Cx_2\Box Rx_2)$ which is determined by the statistic capacity $Cx_2$ of the capacitor $C_2$ and the resistor value $Rx_2$ of the resistor $R_2$ provided in the monostable multivibrator 83. At this time, in the image reproducing apparatus 80, a pulse signal generated from the monostable multivibrator 82 in the power supply unit 51 is supplied to the integrated circuit "74HC4538" of the monostable multivibrator 83 at a terminal B so as to serve as a masking signal for masking the pulse signal inputted at a terminal A as a trigger. For this reason, in the image reproducing apparatus 80, if a relationship expressed as $tw_1 > tw_2$ holds between the monostable multivibrators 82 and 83, the monostable multivibrator 83 will receive the trigger only when the supporting unit 53 starts its swing motion while refusing the reception of the next trigger until a timing period corresponding to the time constant $tw_1$ elapses. With this arrangement, in the image reproducing apparatus 80, after starting the swing motion in the supporting unit 53, the supporting unit 53 will be maintained in a swing motion performing mode at least for a timing period corresponding to the time constant $tw_2$.

Further, the image reproducing apparatus 80 employs an arrangement capable of performing self-starting disclosed in Publication for Registered Patent No. 2937287 as the supporting unit 53 and the swing motion performing unit 81. That is, in the image reproducing apparatus 80, the supporting unit 53 has a permanent magnet 84 in a portion thereof, and a free-running oscillation circuit 85 connected with a coil 86 is provided as the swing motion performing unit 81. In the image reproducing apparatus 80, when the free-running oscillation circuit 85 is energized, the coil 86 generates a magnetic field and this magnetic field causes an electromagnetic force with the permanent magnet 84 provided at the part of the supporting unit 53. Thus, a swing motion is caused in a self-starting manner in the supporting unit 53. Accordingly, in the image reproducing apparatus 80, even if the swing motion is stopped due to any external cause after the start of the swing motion in the supporting unit 53 and before at least the timing period corresponding to the time constant $tw_2$ has elapsed, the swing motion will resume owing to the above-described self-starting action.

As described above, the image reproducing apparatus 80 has the swing motion performing unit 81. Thus, the swing motion can be started in the supporting unit 53 not by an action made by the viewer, but it can be started in a self-starting manner. Accordingly, the swing motion status may be kept for a predetermined period of time and considerable advantage may be provided for the viewer in spite of the fact that the arrangement can be driven at a low electric power consumption.

Meanwhile, each of the above-described image reproducing apparatus 50, 70, 80 is one in which the light source is swingably moved in a repetitive manner with respect to the holographic stereogram so that a reciprocal motion is performed on the irradiating position of the reproducing light with respect to the holographic stereogram. However, the image reproducing apparatus may have another type of arrangement in which the holographic stereogram is rotated in a repetitive manner with respect to the light source so that a reciprocal motion is performed on the irradiating position on the holographic stereogram. Now an image reproducing apparatus having such an arrangement will be hereinafter described.

Figure 22A:
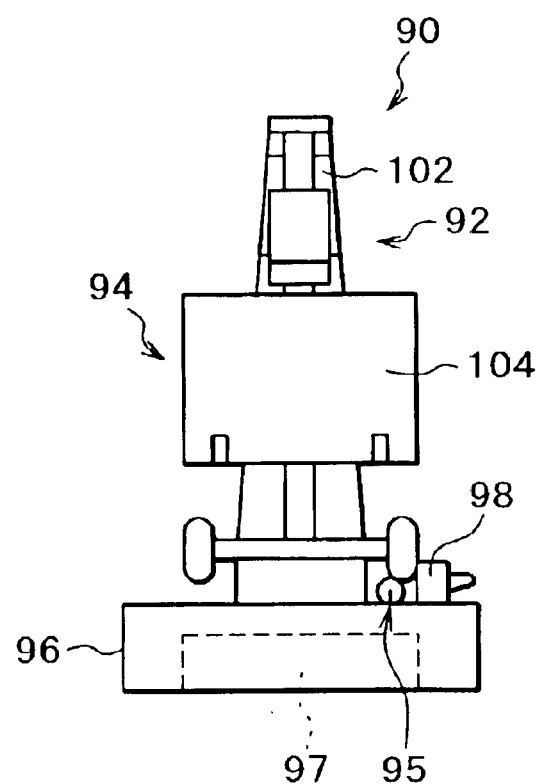
FIG. 22A shows a schematic frontal view of an image reproducing apparatus to which reference is made for describing an appearance of the image reproducing apparatus as another embodiment of the present invention in which the holographic stereogram is turnably moved in a repetitive manner with respect to a light source for irradiating reproducing light and means for detecting the turning motion of a supporting unit is additionally provided, according to a preferred embodiment of the present invention.
Figure 22B:
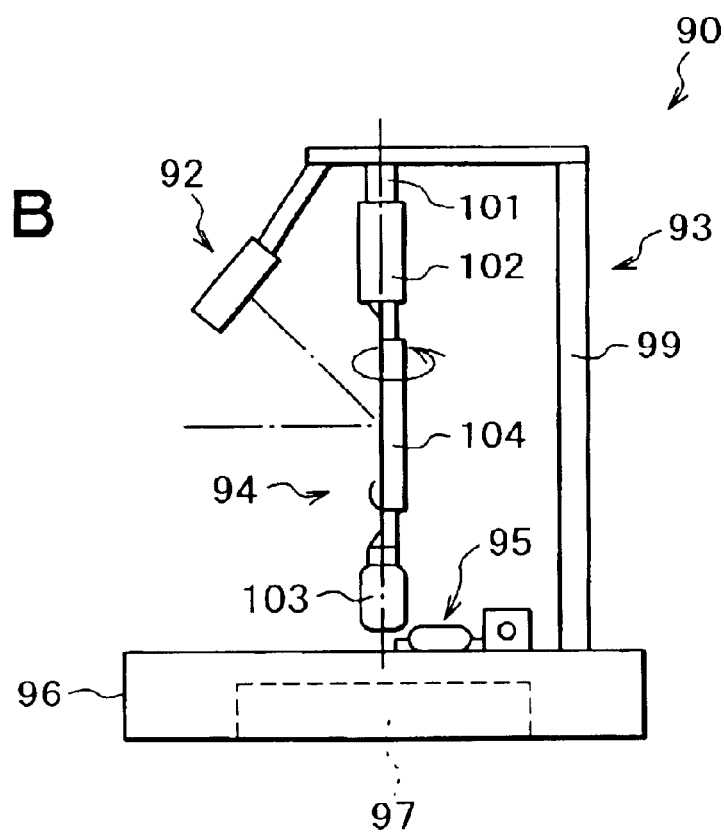
FIG. 22B shows a schematic side view of the image reproducing apparatus to which reference is made for describing an appearance of the image reproducing apparatus as another embodiment of the present invention in which the holographic stereogram is turnably moved in a repetitive manner with respect to the light source for irradiating reproducing light and the means for detecting the turning motion of the supporting unit is additionally provided, according to a preferred embodiment of the present invention.

FIGS. 22A and 22B are schematic diagrams showing an external appearance of an image reproducing apparatus 90. As shown in FIGS. 22A and 22B, components constituting the image reproducing apparatus 90 are roughly classified into the following units. The image reproducing apparatus 90 is arranged to include a power source unit 91, equipped with a power supply for supplying driving electric power and various types of electric circuits, a light source unit 92 as light source means having a light emitting diode or the like, a supporting unit 93 as supporting means for supporting the light source means 92, a holographic stereogram display unit 94 as display means for holding a holographic stereogram and displaying an image recorded thereon, and a turning motion detecting unit 95 as turning motion detecting means for detecting a status of rotation of the holographic stereogram. That is, the components of the image reproducing apparatus 90 approximately correspond to those of the above-described image reproducing apparatus 70, respectively, but the swing motion detecting unit 71 is replaced with the turning motion detecting unit 95.

Figure 23:
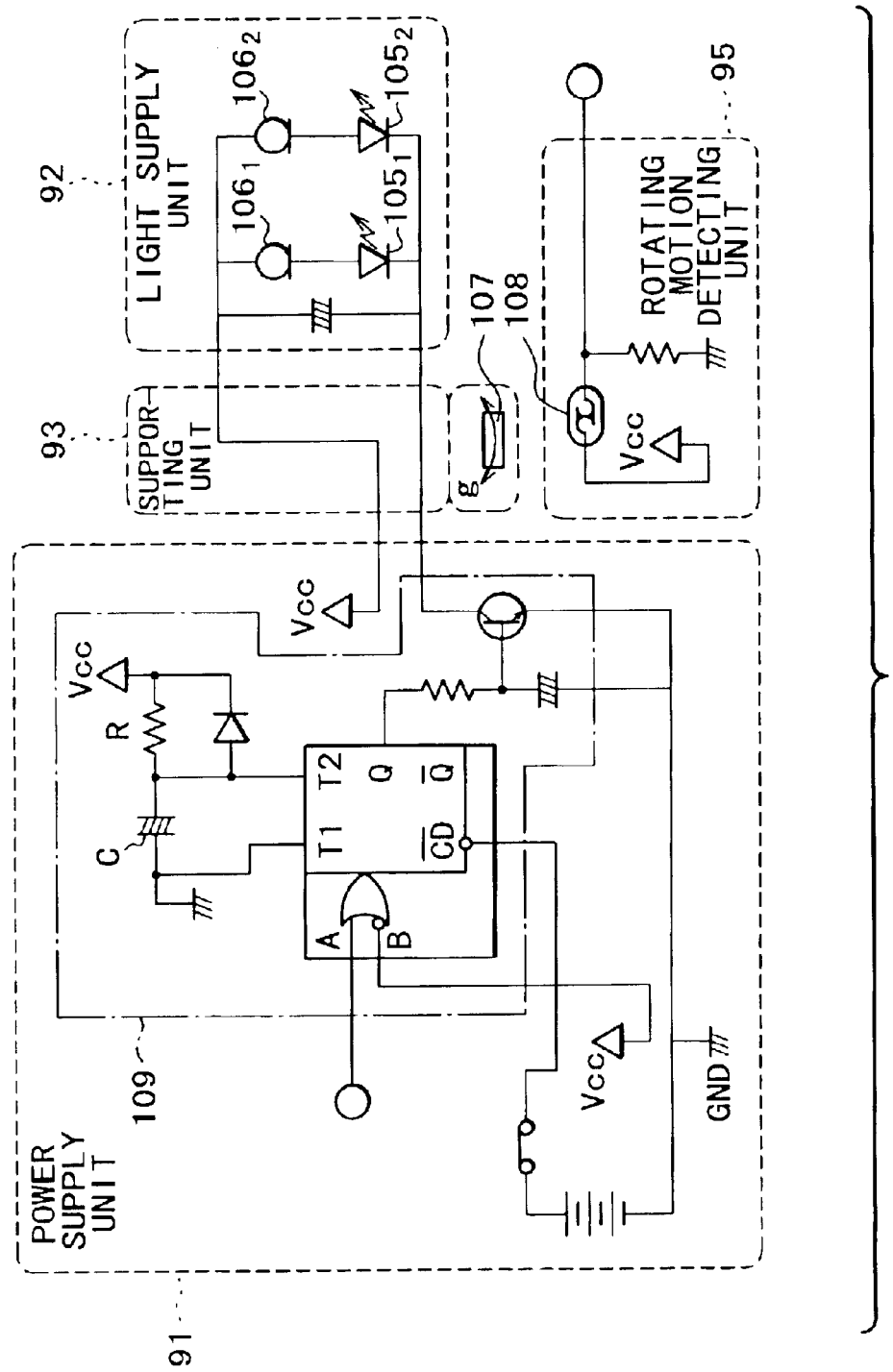
FIG. 23 shows a schematic diagram for describing an electric circuit arrangement of the image reproducing apparatus, according to a preferred embodiment of the present invention.

FIG. 23 is a schematic diagram for describing an electric circuit arrangement of the image reproducing apparatus 90. As shown in FIG. 23, similarly to the above-described power supply unit 51, the power supply unit 91 has a power source 97 such as a battery and electric circuits, not shown, for performing motion on the light source unit 92 and the supporting unit 93 within the internal space of a base place 96 of the image reproducing apparatus. Further, the power supply unit 91 has a switch 98 for carrying out switching between the ON-mode and OFF-mode of the power supply.

Similarly to the above-described light source unit 52, the light source unit 92 is attached to one end of a coupling arm 100 of the supporting unit 93. The light source unit 92 irradiates reproducing light having a predetermined wavelength which is utilized upon fabricating the holographic stereogram, based on the driving electric power supplied from the power supply unit 91. The light source unit 52 may include a plurality of substantial point light sources such as light emitting diodes arrayed in a line fashion or include a linear light source made of any desired optical system. With these arrangements, the light source unit 92 can irradiate substantial parallel rays onto the holographic stereogram held by the holographic stereogram display unit 94.

The supporting unit 93 includes a supporting column 99 standing vertically with respect to the base plate 96, the coupling arm 100 extending laterally so as to form a right angle with the supporting column 99, a rotating member 102 attached to the coupling arm 100 and made rotatable in a direction indicated by an arrow f in FIG. 22B around a supporting shaft 101, and a weight 103 attached to the lower end of the supporting shaft 101 so as to take a counterbalance. The supporting unit 93 is operated based on a driving electric power supplied from the power supply unit 91. In more specific terms, the supporting unit 93 can be rotated in a repetitive manner from an initial status, which will be described later on, in which the major surface of the holographic stereogram display unit 94 is oriented to the front direction to a tilted status in which the rotating member 102 is tilted in a twisting manner in the forward and reverse directions with respect to the front direction. Thus, the holographic stereogram display unit 94 can be rotated in a repetitive manner.

Similarly to the above-described holographic stereogram display unit 54, the holographic stereogram display unit 94 has a holding member 104 for holding the holographic stereogram. Unlike the aforesaid holding member 62, as shown in FIG. 22B, the holding member 104 is attached so as to form a right angle with the base plate 55. The holographic stereogram display unit 94 can be rotated in accordance with the rotation of the supporting unit 53. A viewer will observe an image reproduced on the holographic stereogram which is held by the holographic stereogram display unit 94.

In a similar way to the aforesaid swing motion detecting unit 71, the turning motion detecting unit 95 is disposed on the base plate 96 of the power supply unit 91. As it will be described later on, the turning motion detecting unit 95 supplies a control signal to the light source unit 92 in response to a change in the magnetism caused by the turning motion of the supporting unit 93.

According to the arrangement of the image reproducing apparatus 90 exhibiting the above-described external appearance, when the supporting unit 93 rotates in a repetitive manner around the supporting shaft 101, the holographic stereogram display unit 94 is rotated in a repetitive manner. In this way, in the image reproducing apparatus 90, it becomes possible to perform a reciprocal motion on the irradiating position of the reproducing light with respect to the holographic stereogram which is held by the holographic stereogram display unit 94. Also, in the image reproducing apparatus 90, the turning motion detecting unit 95 detects the status of rotation of the supporting unit 93 and the light source unit 92 is controlled based on the result of detection.

Next, an electric circuit arrangement of the image reproducing apparatus 90 will be described with reference to FIG. 23. In the following description, description will be made on a case in which the light source unit 92 is equipped with a light emitting diode.

In the image reproducing apparatus 90, the light source unit 92 has a plurality of light emitting diodes $105_1$ and $105_2$ connected in parallel and constant current diodes $106_1$ and $106_2$ and so on connected to the light emitting diodes $105_1$ and $105_2$ in series, respectively.

In the image reproducing apparatus 90, the supporting unit 93 has a permanent magnet 107 included in a portion thereof. In the image reproducing apparatus 90, when the supporting unit 93 is rotated in the direction indicated by an arrow g in FIG. 23, magnetic field exerted by the permanent magnet 107 is changed, and this change in the magnetic field is detected by the turning motion detecting unit 95. As a result, the rotating status of the supporting unit 93 can be detected.

In the image reproducing apparatus 90, similarly to the aforesaid image reproducing apparatus 70, the turning motion detecting unit 95 employs a reed switch 108 responsive to the magnetic field. That is, when the permanent magnet 107 approaches the reed switch 108, the status of the reed switch 108 is turned on, causing a pulse signal generated therefrom, and this pulse signal is supplied to the light source unit 92.

In the image reproducing apparatus 90, when the turning motion detecting unit 95 supplies the pulse signal as a trigger to the integrated circuit "74HC4538" of the monostable multivibrator 109 provided in the power supply unit 91 at the terminal A, then the light emitting diodes $105_1$ and $105_2$ can be turned on for a predetermined period of time corresponding to the time constant tw (=0.7·Cx·Rx) which is determined by the statistic capacity Cx of the capacitor C and the resistor value Rx of the resistor R provided in the monostable multivibrator 109. In the image reproducing apparatus 90, if the time period corresponding to the time constant tw elapses, then the light emitting diodes $105_1$ and $105_2$ are turned off.

According to the arrangement of the image reproducing apparatus 90, the holographic stereogram can be swingably moved in a repetitive manner with respect to the light source so that a reciprocal motion is performed on the irradiating position of the reproducing light with respect to the holographic stereogram. Therefore, the viewer can observe in a repetitive manner a reproduced image created in the holographic stereogram without moving the viewer's viewpoint in spite of the fact that the image reproducing apparatus has merely a simple structure.

In addition, in the image reproducing apparatus 90, the turning motion detecting unit 95 detects the rotating status of the supporting unit 93 and the light source unit 92 is controlled based on the result of detection. Therefore, if a viewer touches the supporting unit 93 so as to turn the same, the light source unit 92 can be turned on in response to the turning motion. If a predetermined period of time elapses and/or the supporting unit 93 substantially stops its turning, leading to a status in which the turning motion cannot be detected, then the light source unit 92 can be turned off. Accordingly, in the image reproducing apparatus 90, the viewer need not carry out switching between the turning-on mode and the turning-off mode of the light source unit 92 and great advantage can be provided for the viewer in spite of the fact that electric power consumption is relatively low.

Now description will be made on a variation improvement of the image reproducing apparatus 90 in which, similarly to the aforesaid image reproducing apparatus 80, the turning motion of the supporting unit 93 is not performed by any action of the viewer but the turning motion is spontaneously started (self-starting) or activated by any external action, whereby the status of the turning motion continues for a predetermined period of time. In addition to the arrangement of the above-described image reproducing apparatus 90, this modification of the image reproducing apparatus includes means for driving the supporting unit 93. Therefore, parts corresponding to those of the image reproducing apparatus 90 are identified by the same reference numerals, and further description of such parts will be omitted.

Figure 24A:
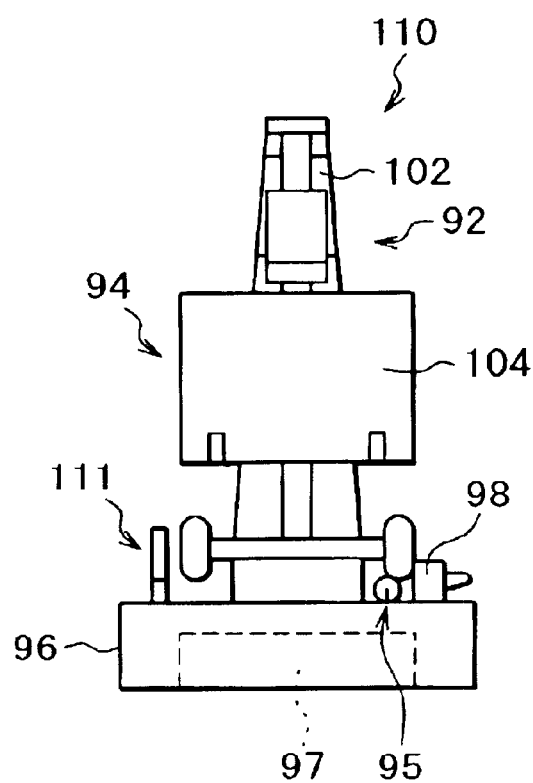
FIG. 24A shows a schematic frontal view of an image reproducing apparatus to which reference is made for describing an appearance of the image reproducing apparatus as another embodiment of the present invention in which the holographic stereogram is turnably moved in a repetitive manner with respect to a light source for irradiating reproducing light and means for performing motion on a supporting unit is additionally provided, according to a preferred embodiment of the present invention.
Figure 24B:
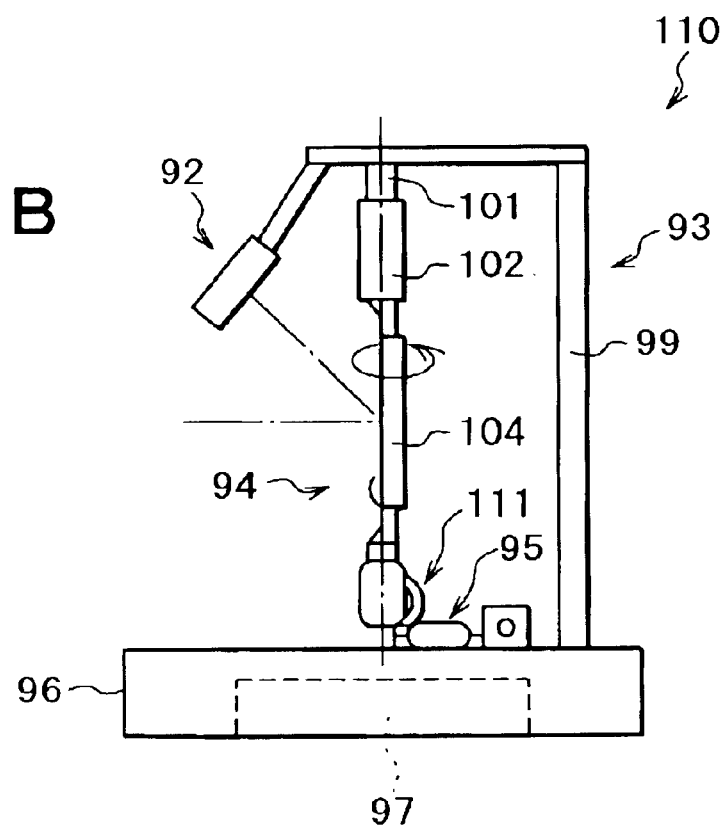
FIG. 24B shows a schematic side view of the image reproducing apparatus to which reference is made for describing an appearance of the image reproducing apparatus as another embodiment of the present invention in which the holographic stereogram is turnably moved in a repetitive manner with respect to the light source for irradiating reproducing light and means for performing motion on the supporting unit is additionally provided, according to a preferred embodiment of the present invention.

FIGS. 24A and 24B are schematic diagrams showing an external appearance of an image reproducing apparatus 110. As shown in FIGS. 24A and 24B, in addition to the above-described components, i.e., the power supply unit 91, the light source unit 92, the supporting unit 93, the holographic stereogram display unit 94, and the turning motion detecting unit 95, the image reproducing apparatus 110 additionally includes a turning motion performing unit 111 as turning motion performing means for performing turning motion on the supporting unit 93.

The turning motion performing unit 111 is a unit for performing a turning motion on the supporting unit 93. This turning motion performing unit 111 is constructed so that magnetic force is performed on the lower end side of the supporting unit 93 to rotate the supporting unit 93 in a self-starting manner or swing motion is maintained for a predetermined period of time.

In the image reproducing apparatus 110 exhibiting the above-described external appearance, the turning motion detecting unit 95 detects the status of turning motion of the supporting unit 93, the light source unit 92 and the turning motion performing unit 111 are controlled based on the detected result, and the supporting unit 93 is controlled in its action.

Figure 25:
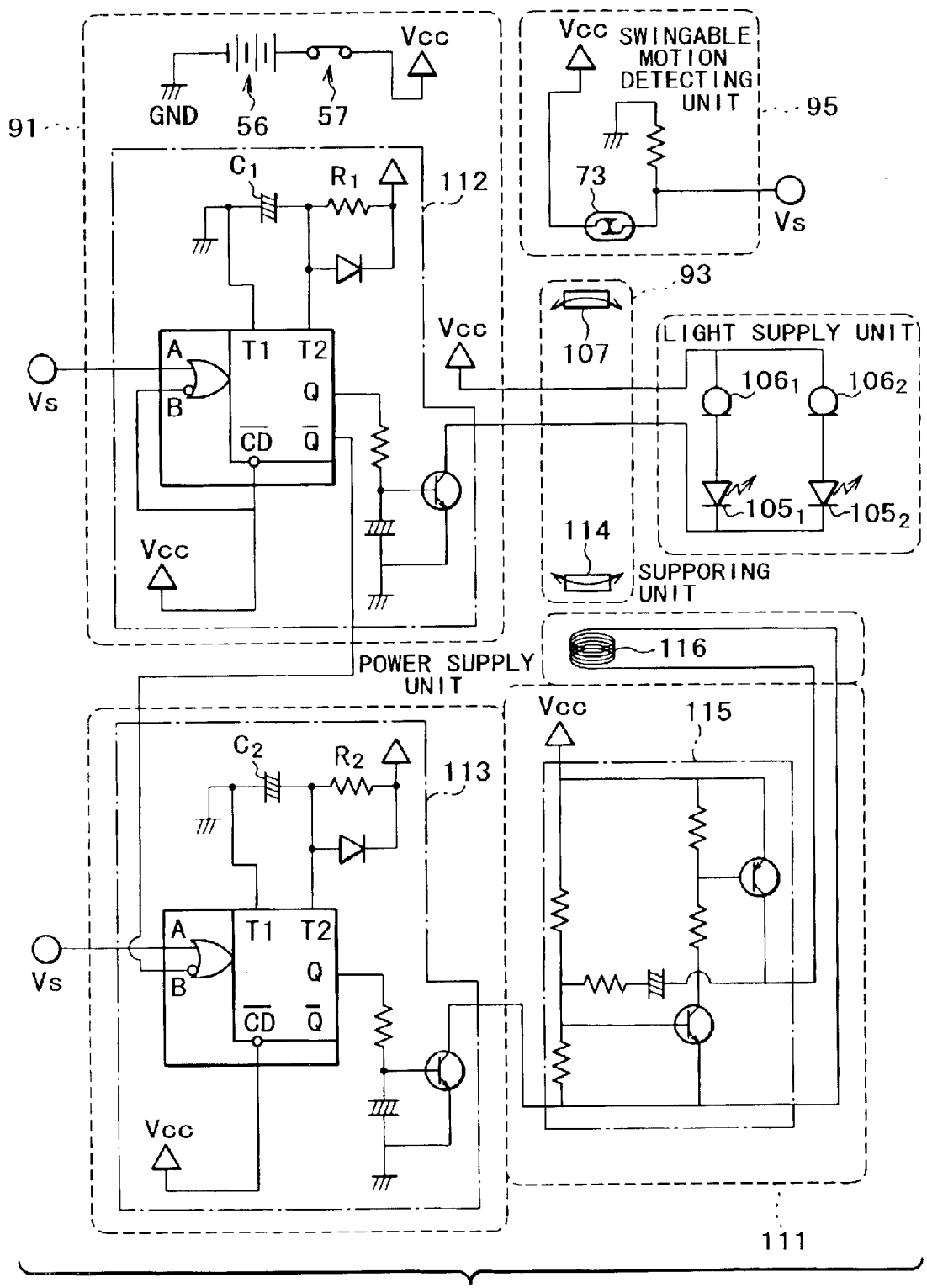
FIG. 25 shows a schematic diagram for describing an electric circuit arrangement of the image reproducing apparatus, according to a preferred embodiment of the present invention.

Now an electric circuit arrangement of the image reproducing apparatus 110 will be described with reference to FIG. 25. In the following description, description will be made on a case in which the light source unit 92 is equipped with a light emitting diode.

In the image reproducing apparatus 110, similarly to the aforesaid image reproducing apparatus 80, the power supply unit 91 has a monostable multivibrator 112 including the integrated circuit "74HC4538". Also, the turning motion performing unit 111 has a monostable multivibrator 113.

In the image reproducing apparatus 110, similarly to the above-described image reproducing apparatus 80, the integrated circuit "74HC4538" continuously generates a pulse signal at a terminal Q-bar for a time period corresponding to a time constant $tw_1$ ($=0.7 \cdot Cx_1 \cdot Rx_1$) which is determined by the statistic capacity $Cx_1$ of the capacitor $C_1$ and the resistor value $Rx_1$ of the resistor $R_1$ provided in the monostable multivibrator 112. In the image reproducing apparatus 110, if the time period corresponding to the time constant $tw_1$ elapses after the turning motion status of the supporting unit 93 cannot be detected, then the light emitting diodes $105_1$ and $105_2$ are turned off.

In the image reproducing apparatus 110, the pulse signal indicative of the detection result of the turning motion status generated from the turning motion detecting unit 95 can be utilized as a trigger for performing a turning motion on the supporting unit 93. In other words, in the image reproducing apparatus 110, the integrated circuit "74HC4538" continuously generates a pulse signal at the terminal Q for a predetermined period of time corresponding to the time constant $tw_2$ ($=0.7 \cdot Cx_2 \cdot Rx_2$) which is determined by the statistic capacity $Cx_2$ of the capacitor $C_2$ and the resistor value $Rx_2$ of the resistor $R_2$ provided in the monostable multivibrator 113. With this arrangement, in the image reproducing apparatus 110, after starting the turning motion in the supporting unit 93, the supporting unit 93 will be maintained in a turning motion performing mode at least for a timing period corresponding to the time constant $tw_2$.

In the image reproducing apparatus 110, the supporting unit 93 has a permanent magnet 114 provided at part thereof, and a free-running oscillation circuit 115 connected with a coil 116 is provided as the turning motion performing unit 111. In the image reproducing apparatus 110, when the free-running oscillation circuit 115 is energized, the coil 116 generates a magnetic field and this magnetic field causes an electromagnetic force with the permanent magnet 114 provided at the part of the supporting unit 93. Thus, a turning motion is caused in a self-starting manner in the supporting unit 93. Accordingly, in the image reproducing apparatus 110, even if the turning motion is stopped due to any external cause after the start of the turning motion in the supporting unit 93 and before at least the timing period corresponding to the time constant $tw_2$ has elapsed, the swing motion will resume owing to the above-described self-starting action.

As described above, the image reproducing apparatus 110 has the turning motion performing unit 111. Thus, the turning motion can be started in the supporting unit 93 in a self-starting manner. Accordingly, the turning motion status can be continued for a predetermined period of time and great advantage can be provided for the viewer in spite of the fact that the arrangement can be driven at a low level electric power consumption.

As described above, according to the image reproducing apparatuses as preferred embodiments of the present invention, by using the principle of a pendulum, the light source is swingably moved in a repetitive manner with respect to the holographic stereogram so that a reciprocal motion is performed on the irradiating position of the rays of light with respect to the holographic stereogram. Alternatively, by using the principle of a torsion pendulum, the light source is turnably moved in a repetitive manner with respect to the holographic stereogram so that a reciprocal motion is performed on the irradiating position of the rays of light with respect to the holographic stereogram. Thus, the relative reciprocal motion can be maintained between the light source and the holographic stereogram for a predetermined period of time. Therefore, the viewer can observe in a repetitive manner a reproduced image created in the holographic stereogram without moving the viewer's viewpoint in spite of the fact that the image reproducing apparatus has merely a simple structure and consumes electric power at a low level. Accordingly, in the image reproducing apparatus, it becomes possible to reproduce reliably the holographic stereogram image while making the viewer free from a cumbersome task while observing the image, and hence significant advantage can be provided for the viewer.

Although the invention having been described in its preferred form with a certain degree of particularity, other changes, variations, combinations and sub-combinations are possible therein. It is therefore to be understood that any modifications will be practiced otherwise than as specifically described herein without departing from the scope and spirit of the present invention.

For example, the present invention can be applied not to holographic stereograms but to holograms. That is, although the above description has been made on the embodiments in which an image recorded on the holographic stereogram fabricated by the holographic stereogram fabricating apparatus is reproduced by the image reproducing apparatus, the present invention can be applied without difficulty to a case in which a fabricated hologram is held on the holographic stereogram display unit of the image reproducing apparatus and a viewer observes the hologram held on the holographic stereogram display unit.

While in the above-described embodiments, description has been made on the case in which 3D image data and time-sequential video information are recorded on a holographic stereogram by a light exposure process and this holographic stereogram is reproduced by the image reproducing apparatus, the present invention may be applied to a case in which the holographic stereogram has only 2D image data recorded thereon by a light exposure process and this information is reproduced by the image reproducing apparatus.

While in the above-described embodiments, description has been made on the image reproducing apparatus for reproducing the information recorded on the holographic stereogram, the present invention may be applied to an arrangement of an irradiating apparatus in which reproducing light is irradiated on the holographic stereogram.

Furthermore, while in the above-described embodiments, description has been made on the case in which either the light source or the holographic stereogram is moved with respect to the other, the present invention may be applied to any case in which relative or reciprocal motion is performed on the reproducing light which is irradiated onto the major surface of the holographic stereogram. For example, the present invention may be applied to a case in which both the light source and the holographic stereogram are fixed and the reproducing light emitted from the fixed light source is led to the fixed holographic stereogram by way of a process of reflection on a mirror or the like, and this mirror or the like is rotated, turned, etc., so as to cause displacement in the angle of incidence of the reproducing light.

What is claimed is:

1. An image reproducing apparatus for reproducing image data recorded on a hologram or a holographic stereogram by a light exposure process, comprising:
   display means for holding the hologram or the holographic stereogram and displaying an image thereon;
   light source for irradiating reproducing light for reproducing the image data on the hologram or holographic stereogram being held by the display means;
   power supply for supplying driving power to at least the light source; and
   supporting means for supporting the light source and swingably moving the light source in a repetitive manner with respect to the hologram or the holographic stereogram being held by the display means so that a reciprocal motion is performed on an irradiating position of the reproducing light with respect to the hologram or the holographic stereogram.

2. An image reproducing apparatus according to claim 1, wherein the light source includes a plurality of point light sources disposed in a linear array.

3. An image reproducing apparatus according to claim 2, wherein each of the point light sources is arranged to irradiate reproducing light having constrained diverging angle.

4. An image reproducing apparatus according to claim 1, wherein the light source includes a linear light source.

5. An image reproducing apparatus according to claim 1, wherein the supporting means has at least two supporting points electrically insulated from each other and electric power is supplied from the power supply to the light source through the supporting points.

6. An image reproducing apparatus according to claim 5, wherein the light source has smoothing means for controlling an amount of current supplied from the power supply through the supporting points.

7. An image reproducing apparatus according to claim 5, wherein the light source includes a constant-current means for keeping an amount of current supplied from the power supply through the supporting points constant.

8. An image reproducing apparatus according to claim 1, further comprising swing motion detecting means for detecting swing motion of the supporting means, wherein the light source is controlled based on a result of detection by the swing motion detecting means.

9. An image reproducing apparatus according to claim 8, wherein the swing motion detecting means detects the swing motion of the supporting means based on change of magnetic field caused by the swing motion of the supporting means.

10. An image reproducing apparatus according to claim 8, wherein the light source is turned on for a period of time based on the result of detection by the swing motion detecting means.

11. An image reproducing apparatus according to claim 10, wherein the light source is turned off when a period of time corresponding to a time constant based on the result of detection by the swing motion detecting means is elapsed.

12. An image reproducing apparatus according to claim 1, further comprising swing motion performing means for performing swing motion of the supporting means.

13. An image reproducing apparatus according to claim 12, further comprising swing motion detecting means for detecting swing motion of the supporting means, wherein the swing motion performing means is controlled based on the result of detection by the swing motion detecting means.

14. An image reproducing apparatus according to claim 13, wherein the swing motion performing means keeps swing motion of the supporting means for a period of time based on the result of detection by the swing motion detecting means.

15. An image reproducing apparatus according to claim 14, wherein the swing motion performing means stops the swing motion of the supporting means after a period of time corresponding to a time constant based on the result of detection by the swing motion detecting means is elapsed.

16. An image reproducing apparatus according to claim 13, wherein the light source is controlled based on the result of detection by the swing motion detecting means.

17. An image reproducing apparatus according to claim 12, wherein the swing motion performing means performs the swing motion on the supporting means in a self-starting manner.

18. An image illuminating apparatus for irradiating reproducing light on a hologram or a holographic stereogram for reproducing image data recorded on the hologram or the holographic stereogram by light exposure, the apparatus comprising:
light source for irradiating light;
power supply for supplying a driving power to the light source; and
supporting means for supporting the light source and swingably moving the light source in a repetitive manner with respect to the hologram or the holographic stereogram so that a reciprocal motion is performed on the irradiating position of the reproducing light with respect to the hologram or the holographic stereogram.

19. An image illuminating apparatus according to claim 18, wherein the light source includes a plurality of point light sources disposed in a linear array.

20. An image illuminating apparatus according to claim 18, wherein each of the point light sources is arranged to irradiate reproducing light having constrained diverging angle.

21. An image illuminating apparatus according to claim 18, wherein the light source includes a linear light source.

22. An image illuminating apparatus according to claim 18, wherein the supporting means has at least two supporting points electrically insulated from each other and electric power is supplied from the power supply to the light source through the supporting points.

23. An image illuminating apparatus according to claim 22, wherein the light source has smoothing means for controlling an amount of current supplied from the power supply through the supporting points.

24. An image illuminating apparatus according to claim 22, wherein the light source includes a constant-current means for keeping an amount of current supplied from the power supply through the supporting points constant.

25. An image illuminating apparatus according to claim 18, further comprising swing motion detecting means for detecting swing motion of the supporting means, wherein the light source is controlled based on a result of detection by the swing motion detecting means.

26. An image illuminating apparatus according to claim 25, wherein the swing motion detecting means detects the swing motion of the supporting means based on change of magnetic field caused by the swing motion of the supporting means.

27. An image illuminating apparatus according to claim 25, wherein the light source is turned on for a period of time based on the result of detection by the swing motion detecting means.

28. An image illuminating apparatus according to claim 27, wherein the light source is turned off when a period of time corresponding to a time constant based on the result of detection by the swing motion detecting means is elapsed.

29. An image illuminating apparatus according to claim 18, further comprising swing motion performing means for performing swing motion of the supporting means.

30. An image illuminating apparatus according to claim 29, further comprising swing motion detecting means for detecting swing motion of the supporting means, wherein the swing motion performing means is controlled based on the result of detection by the swing motion detecting means.

31. An image illuminating apparatus according to claim 30, wherein the swing motion performing means keeps swing motion of the supporting for a period of time based on the result of detection by the swing motion detecting means.

32. An image illuminating apparatus according to claim 31, wherein the swing motion performing means stops the swing motion of the supporting means after a period of time corresponding to a time constant based on the result of detection by the swing motion detecting means is elapsed.

33. An image illuminating apparatus according to claim 30, wherein the light source is controlled based on the result of detection by the swing motion detecting means.

34. An image illuminating apparatus according to claim 29, wherein the swing motion performing means performs the swing motion on the supporting means in a self-starting manner.

35. An image reproducing apparatus for reproducing image data recorded on a hologram or a holographic stereogram by light exposure, comprising:
display means for holding the hologram or the holographic stereogram and displaying an image thereon;
light source for irradiating reproducing light for reproducing the image data in the hologram or the holographic stereogram being held by the display means;
power supply for supplying a driving power to at least the light source; and
supporting means for supporting the light source and turnably moving the display means in a repetitive manner with respect to the light source so that a reciprocal motion is performed on the irradiating position of the reproducing light with respect to the hologram or the holographic stereogram being held by the display means.

36. An image reproducing apparatus according to claim 35, wherein the light source includes a plurality of point light sources disposed in a linear array.

37. An image reproducing apparatus according to claim 36, wherein each of the point light sources is arranged to irradiate reproducing light having constrained diverging angle.

38. An image reproducing apparatus according to claim 35, wherein the light source includes a linear light source.

39. An image reproducing apparatus according to claim 35, wherein the supporting means has at least two supporting points electrically insulated from each other and electric power is supplied from the power supply to the light source through the supporting points.

40. An image reproducing apparatus according to claim 39, wherein the light source has smoothing means for controlling an amount of current supplied from the power supply through the supporting points.

41. An image reproducing apparatus according to claim 39, wherein the light source includes a constant-current means for keeping an amount of current supplied from the power supply through the supporting points constant.

42. An image reproducing apparatus according to claim 35, further comprising turning motion detecting means for detecting turning motion of the supporting means, wherein the light source is controlled based on a result of detection by the turning motion detecting means.

43. An image reproducing apparatus according to claim 42, wherein the turning motion detecting means detects the turning motion of the supporting means based on change of magnetic field caused by the turning motion of the supporting means.

44. An image reproducing apparatus according to claim 42, wherein the light source is turned on for a period of time based on the result of detection by the turning motion detecting means.

45. An image reproducing apparatus according to claim 44, wherein the light source is turned off when a period of time corresponding to a time constant based on the result of detection by the turning motion detecting means is elapsed.

46. An image reproducing apparatus according to claim 35, further comprising turning motion performing means for performing turning motion of the supporting means.

47. An image reproducing apparatus according to claim 46, further comprising turning motion detecting means for detecting turning motion of the supporting means, wherein the turning motion performing means is controlled based on the result of detection by the turning motion detecting means.

48. An image reproducing apparatus according to claim 47, wherein the turning motion performing means keeps the turning motion of the supporting means for a period of time based on the result of detection by the turning motion detecting means.

49. An image reproducing apparatus according to claim 48, wherein the turning motion performing means stops the turning motion of the supporting means after a period of time corresponding to a time constant based on the result of detection by the turning motion detecting means is elapsed.

50. An image reproducing apparatus according to claim 47, wherein the light source is controlled based on the result of detection by the turning motion detecting means.

51. An image reproducing apparatus according to claim 46, wherein the turning motion performing means performs the turning motion on the supporting means in a self-starting manner.

* * * * *

UNITED STATES PATENT AND TRADEMARK OFFICE
CERTIFICATE OF CORRECTION

PATENT NO. : 6,856,434 B2
DATED : February 15, 2005
INVENTOR(S) : Koji Ashizaki

It is certified that error appears in the above-identified patent and that said Letters Patent is hereby corrected as shown below:

Column 30,
Line 17, "supporting" should read -- supporting means --.

Signed and Sealed this

Thirteenth Day of September, 2005

JON W. DUDAS
*Director of the United States Patent and Trademark Office*